US009673574B2

(12) United States Patent
Endo et al.

(10) Patent No.: US 9,673,574 B2
(45) Date of Patent: Jun. 6, 2017

(54) CONNECTOR TERMINAL, ELECTRIC CONNECTOR, AND METHOD OF FABRICATING THE CONNECTOR TERMINAL

(71) Applicant: DAI-ICHI SEIKO CO., LTD., Kyoto (JP)

(72) Inventors: Takayoshi Endo, Shizuoka (JP); Takuya Takeda, Shizuoka (JP)

(73) Assignee: DAI-ICHI SEIKO CO., LTD., Kyoto (JP)

( * ) Notice: Subject to any disclaimer, the term of this patent is extended or adjusted under 35 U.S.C. 154(b) by 0 days.

(21) Appl. No.: 14/479,678

(22) Filed: Sep. 8, 2014

(65) Prior Publication Data
US 2015/0079851 A1 Mar. 19, 2015

(30) Foreign Application Priority Data
Sep. 13, 2013 (JP) .................... 2013-190824

(51) Int. Cl.
H01R 13/40 (2006.01)
H01R 13/73 (2006.01)
(Continued)

(52) U.S. Cl.
CPC ....... H01R 13/73 (2013.01); B29C 45/14418 (2013.01); H01R 12/585 (2013.01);
(Continued)

(58) Field of Classification Search
CPC ...... H01R 13/73; H01R 43/16; H01R 13/405; H01R 43/24; H01R 13/02
See application file for complete search history.

(56) References Cited

U.S. PATENT DOCUMENTS 4,526,429 A * 7/1985 Kirkman ............ H01R 12/58
439/751
4,735,575 A * 4/1988 Shaffer ............ H01R 12/585
439/751
(Continued)

FOREIGN PATENT DOCUMENTS

JP S61-173168 10/1986
JP S62-109364 7/1987
(Continued)

OTHER PUBLICATIONS

Office Action issued by the JPO on Mar. 8, 2016, to corresponding Japanese Patent Application No. 2013-190824, with Machine translation.

Primary Examiner — Briggitte R Hammond
(74) Attorney, Agent, or Firm — Wenderoth, Lind & Ponack, L.L.P.

(57) ABSTRACT

A connector terminal includes a press-fit terminal and a shaft portion, the connector terminal being fabricated of a single metal sheet, the shaft portion having a lateral cross section having a size entirely covering therewith a lateral cross section of the press-fit terminal when viewed in an axial direction of the connector terminal, the shaft portion having surfaces extending in the axial direction at an entire circumference thereof, the lateral cross section of the shaft portion being identical in shape with a lateral cross section of a terminal space of a die used for fabricating a housing for the press-fit terminal, the press-fit terminal being fit into the terminal space when the housing is molded with resin.

5 Claims, 44 Drawing Sheets

(51) Int. Cl.
  *H01R 12/58* (2011.01)
  *H01R 13/405* (2006.01)
  *H01R 43/24* (2006.01)
  *H01R 43/16* (2006.01)
  *B29L 31/34* (2006.01)
  *B29C 45/14* (2006.01)
  *B29K 705/00* (2006.01)

(52) U.S. Cl.
  CPC ........... *H01R 13/405* (2013.01); *H01R 43/16* (2013.01); *H01R 43/24* (2013.01); *B29C 45/14065* (2013.01); *B29C 45/14549* (2013.01); *B29K 2705/00* (2013.01); *B29L 2031/34* (2013.01); *B29L 2031/3425* (2013.01); *Y10T 29/49204* (2015.01)

(56) References Cited

U.S. PATENT DOCUMENTS

| | | | | |
|---|---|---|---|---|
| 5,073,326 | A | * | 12/1991 | Craves .................... B29C 45/04 249/95 |
| D551,623 | S | * | 9/2007 | Lee .............................. D13/133 |
| D594,420 | S | * | 6/2009 | Koushiro ...................... D13/154 |
| 8,951,459 | B2 | * | 2/2015 | Nagashima ....... B29C 45/14065 264/275 |
| 2003/0049972 | A1 | * | 3/2003 | Aoki .................... H01R 12/585 439/751 |
| 2004/0175970 | A1 | * | 9/2004 | Shioda ................. H01R 12/716 439/79 |
| 2005/0221687 | A1 | | 10/2005 | Nakamura et al. |
| 2007/0010139 | A1 | * | 1/2007 | Chen .................... H01R 12/585 439/751 |
| 2010/0317239 | A1 | * | 12/2010 | Achammer .......... H01R 12/585 439/676 |
| 2011/0217883 | A1 | * | 9/2011 | Kawai .................. H01R 12/585 439/733.1 |
| 2011/0263158 | A1 | * | 10/2011 | Nishikata ............. H01R 13/405 439/626 |
| 2013/0244512 | A1 | | 9/2013 | Endo et al. |
| 2014/0349520 | A1 | * | 11/2014 | Aizawa .............. H01R 13/6588 439/607.12 |

FOREIGN PATENT DOCUMENTS

| | | |
|---|---|---|
| JP | 2000-150038 | 5/2000 |
| JP | 2005-11587 | 1/2005 |
| JP | 2005-222771 | 8/2005 |
| JP | 2006-216523 | 8/2006 |
| JP | 2009-230947 | 10/2009 |
| JP | 2013-65543 | 4/2013 |
| JP | 2013-143345 | 7/2013 |

* cited by examiner

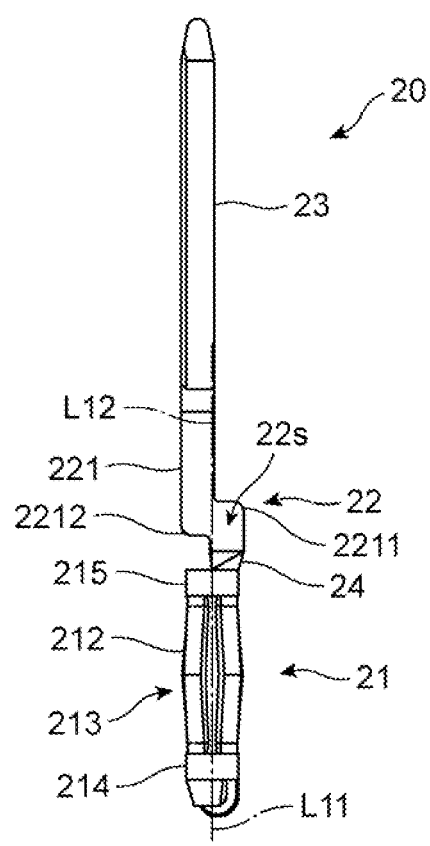

CONNECTOR TERMINAL, ELECTRIC CONNECTOR, AND METHOD OF FABRICATING THE CONNECTOR TERMINAL

CROSS-REFERENCE TO RELATED APPLICATION

The entire disclosure of Japanese Patent Application No. 2013-190824 filed on Sep. 13, 2013 including the specification, claims, drawings and summary is incorporated herein by reference in its entirety.

BACKGROUND OF THE INVENTION

Field of the Invention

The invention relates to a connector terminal, an electric connector including the connector terminal, and a method of fabricating the connector terminal.

Description of the Related Art

There is known an electric connector including a housing molded with resin and supporting a terminal therein such that the terminal is exposed out of the housing.

FIG. 44 is a perspective view of a terminal 100 suggested in Japanese Patent Application Publication No. 2000-150038. The terminal 100 includes a pair of protrusions 101 each fabricated by folding a metal sheet one on another such that the protrusions 101 are located adjacent to each other through side edges thereof. The protrusions 101 are bound at proximal ends thereof to each other by an end surface 104 of a strip 103 formed by bending a metal sheet. The strip 103 prevents molten resin from penetrating a gap 102 formed between the protrusions 101.

FIG. 45 is a cross-sectional view of a press-fit pin 110 suggested in Japanese Patent Application Publication No. 2005-11587. The press-fit pin 110 includes a flexible press-fit terminal 111 extending in a longitudinal direction, and a body 112 to be molded with resin. The body 112 is bent to thereby form first and second resin stoppers 113 and 114 protruding beyond the press-fit terminal 111 in a thickness-wise direction of the press-fit pin 110. The first resin stopper 113 and the second resin stopper 114 protrude in opposite directions to each other.

In the terminal 100 illustrated in FIG. 44, since a metal sheet is folded such that the protrusions 101 are located adjacent to each other through side edges thereof, the protrusions 101 have a thickness equal to the same of a portion 105 around which the strip 103 is wound. Thus, a process of folding a metal sheet such that the protrusions 101 are located adjacent to each other through side edges thereof cannot be applied to a connector terminal including a thick press-fit terminal at a center.

In the press-fit pin 110 illustrated in FIG. 45, the first and second resin stoppers 113 and 114 are formed by bending the body 112. Thus, if a highly pressurized resin 115 is supplied into an aperture 116 of a die 117, the first resin stopper 113 making first contact with the resin 115 is pushed by the resin 115, and hence, the first resin stopper 113 is made released from an inner surface of the aperture 116 with the second resin stopper 114 acting as a fulcrum, resulting in that the resin 115 penetrates an area in which the press-fit terminal 111 is located.

SUMMARY OF THE INVENTION

In view of the above-mentioned problems in the prior art, it is an object of the present invention to provide a connector terminal capable of preventing penetration of resin when a housing in which the connector terminal is supported is molded with resin.

It is further an object of the present invention to provide an electric connector including the connector terminal.

It is further an object of the present invention to provide a method of fabricating a connector terminal.

It is further an object of the present invention to provide a method of fabricating a shaft portion of the above-mentioned connector terminal.

In the first aspect of the present invention, there is provided a connector terminal including a press-fit terminal and a shaft portion, the connector terminal being fabricated of a single metal sheet, the shaft portion having a lateral cross-section having a size entirely covering therewith a lateral cross-section of the press-fit terminal when viewed in an axial direction of the connector terminal, the shaft portion having surfaces extending in the axial direction at an entire circumference thereof, the lateral cross-section of the shaft portion being identical in shape with a lateral cross-section of a terminal space of a die used for fabricating a housing for the press-fit terminal, the press-fit terminal being fit into the terminal space when the housing is molded with resin.

In the conventional press-fit pin 110 illustrated in FIG. 45, the first and second resin stoppers 113 and 114 merely make line contact at a top 113A and 114A thereof with an inner surface of the aperture 116 of the die 117. Accordingly, if the resin 115 supplied into the aperture 116 had a high pressure, the first resin stopper 113 is made to swing around the top 114A of the second resin stopper 114, resulting in that the resin 115 penetrates a space in which the press-fit pin terminal 111 is located. In contrast, the connector terminal in accordance with the present invention is designed to include the shaft portion having surfaces extending in the axial direction of the connector terminal at an entire circumference thereof, and further having a lateral cross-section identical with a lateral cross-section of the aperture 116 of the die 117. Accordingly, when the connector terminal is inserted into the aperture 116 of the die 117, the shaft portion makes surface contact with an inner surface of the aperture 116. This ensures that the shaft portion is not deformed even by a high pressure of the resin 115, and accordingly, the shaft portion can keep in close contact with an inner surface of the aperture 116, and is not released therefrom. Thus, the resin 115 is prevented from penetrating a space in which the press-fit terminal is located.

It is preferable that the connector terminal further includes an adjustment portion situated between the shaft portion and the press-fit terminal, the adjustment portion being deformable in a plane perpendicular to the axial direction.

If imaginary longitudinal center lines of the press-fit terminal and the shaft portion were not concentric with each other, a lateral cross-section of the press-fit terminal might extend beyond a lateral cross-section of the shaft portion, resulting in that the press-fit terminal could not be inserted into an aperture of a die. Since the adjustment is designed to be deformable in a plane perpendicular to the axial direction of the electric connector, the imaginary longitudinal center lines of the press-fit terminal and the shaft portion can be concentric with each other by deforming (for instance, shifting) the adjustment portion, even if the imaginary longitudinal center lines of the press-fit terminal and the shaft portion are not concentric with each other.

It is preferable that the shaft portion has a length greater than the same of the press-fit terminal in first and second directions perpendicular to each other, the first and second directions being perpendicular to the axial direction.

For instance, the shaft portion may be L-shaped in one of the first and second directions.

For instance, the shaft portion may be crank-shaped in one of the first and second directions.

For instance, the shaft portion may be zigzag-shaped in the axial direction.

It is preferable that the shaft portion includes a first portion being J-shaped in one of the first and second directions, and a second portion being J-shaped in the opposite direction to the first portion.

It is preferable that at least a part of the shaft portion has a length greater than the same of the press-fit terminal in one of the first and second directions.

It is preferable that the shaft portion has a circular lateral cross-section.

It is preferable that the shaft portion has a rectangular lateral cross-section.

In the second aspect of the present invention, there is provided an electric connector including a connector terminal including a press-fit terminal and a shaft portion, the connector terminal being fabricated of a single metal sheet, and a housing supporting the connector terminal such that the press-fit terminal is exposed out of the housing, the shaft portion having a lateral cross-section having a size entirely covering therewith a lateral cross-section of the press-fit terminal when viewed in an axial direction of the connector terminal, the shaft portion having surfaces extending in the axial direction at an entire circumference thereof, the lateral cross-section of the shaft portion being identical in shape with a lateral cross-section of a terminal space of a die used for fabricating the housing, the press-fit terminal being fit into the terminal space when the housing is molded with resin.

In the third aspect of the present invention, there is provided a method of fabricating a connector terminal out of a single metal sheet, the connector terminal including a press-fit terminal and a shaft portion, the method including bending the metal sheet to form the press-fit terminal, and bending the metal sheet to form the shaft portion, the shaft portion having a lateral cross-section having a size entirely covering therewith a lateral cross-section of the press-fit terminal when viewed in an axial direction of the connector terminal, the shaft portion having surfaces extending in the axial direction at an entire circumference thereof, the lateral cross-section of the shaft portion being identical in shape with a lateral cross-section of a terminal space of a die used for fabricating a housing for the press-fit terminal, the press-fit terminal being fit into the terminal space when the housing is molded with resin.

In the fourth aspect of the present invention, there is provided a method of fabricating a shaft portion in a connector terminal including a press-fit terminal and the shaft portion, the connector terminal being fabricated of a single metal sheet, the shaft portion having a lateral cross-section having a size entirely covering therewith a lateral cross-section of the press-fit terminal when viewed in an axial direction of the connector terminal, the shaft portion having surfaces extending in the axial direction at an entire circumference thereof, the lateral cross-section of the shaft portion being identical in shape with a lateral cross-section of a terminal space of a die used for fabricating a housing for the press-fit terminal, the press-fit terminal being fit into the terminal space when the housing is molded with resin, the method including bending at least once a portion of the metal sheet defining the shaft portion, in a direction perpendicular to an axial direction of the connector terminal to increase a length of the shaft portion in the direction perpendicular to the axial direction.

It is preferable that the portion of the metal sheet is bent at least once into an L-shape.

It is preferable that the portion of the metal sheet is bent into a crank.

It is preferable that the portion of the metal sheet is bent at least once into a J-shape.

In the fifth aspect of the present invention, there is provided a method of fabricating a shaft portion in a connector terminal including a press-fit terminal and the shaft portion, the connector terminal being fabricated of a single metal sheet, the shaft portion having a lateral cross-section having a size entirely covering therewith a lateral cross-section of the press-fit terminal when viewed in an axial direction of the connector terminal, the shaft portion having surfaces extending in the axial direction at an entire circumference thereof, the lateral cross-section of the shaft portion being identical in shape with a lateral cross-section of a terminal space of a die used for fabricating a housing for the press-fit terminal, the press-fit terminal being fit into the terminal space when the housing is molded with resin, the method including shifting a thickness of a portion of the metal sheet defining the shaft portion into a predetermined location to increase a thickness of the metal sheet.

It is preferable that a thickness at opposite ends of the metal sheet is shifted to a center of the metal sheet.

It is preferable that a thickness at opposite ends of the metal sheet is shifted in an axial direction of the connector terminal.

The advantages obtained by the aforementioned present invention will be described hereinbelow.

In the conventional press-fit pin 110 illustrated in FIG. 45, the first resin stopper 113 makes contact at a top 113A thereof with an inner surface of the aperture 116 of the die 117, and similarly, the second resin stopper 114 makes contact at a top 114A thereof with an inner surface of the aperture 116 of the die 117. That is, the first and second resin stoppers 113 and 114 merely make line contact with the inner surface of the aperture 116. Accordingly, if the resin 115 supplied into the aperture 116 had a high pressure, the first resin stopper 113 is made to swing around the top 114A of the second resin stopper 114, resulting in that the resin 115 penetrates a space in which the press-fit pin terminal 111 is located.

In contrast, the connector terminal in accordance with the present invention is designed to include the shaft portion having surfaces extending in the axial direction of the connector terminal at an entire circumference thereof, and further having a lateral cross-section identical with a lateral cross-section of the aperture 116 of the die 117. Accordingly, when the connector terminal is inserted into the aperture 116 of the die 117, the shaft portion makes surface contact with an inner surface of the aperture 116. This ensures that the shaft portion is not deformed even by a high pressure of the resin 115, and accordingly, the shaft portion can keep in close contact with an inner surface of the aperture 116, and is not released therefrom. Thus, the resin 115 is prevented from penetrating a space in which the press-fit terminal is located.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIG. 7 is a right side view of the connector terminal illustrated in FIG. 5.

DESCRIPTION OF THE PREFERRED EMBODIMENTS

Preferred embodiments in accordance with the present invention will be explained hereinbelow with reference to drawings.

First Embodiment

An electric connector 10 in accordance with the first embodiment, illustrated in FIGS. 1 to 4, is mounted on a printed circuit board (not illustrated). The electric connector 10 includes six connector terminals 20 arranged in two rows each including three connector terminals 20 in a line, and a housing 30 molded with resin by an insert-mold process.

Figure 1:
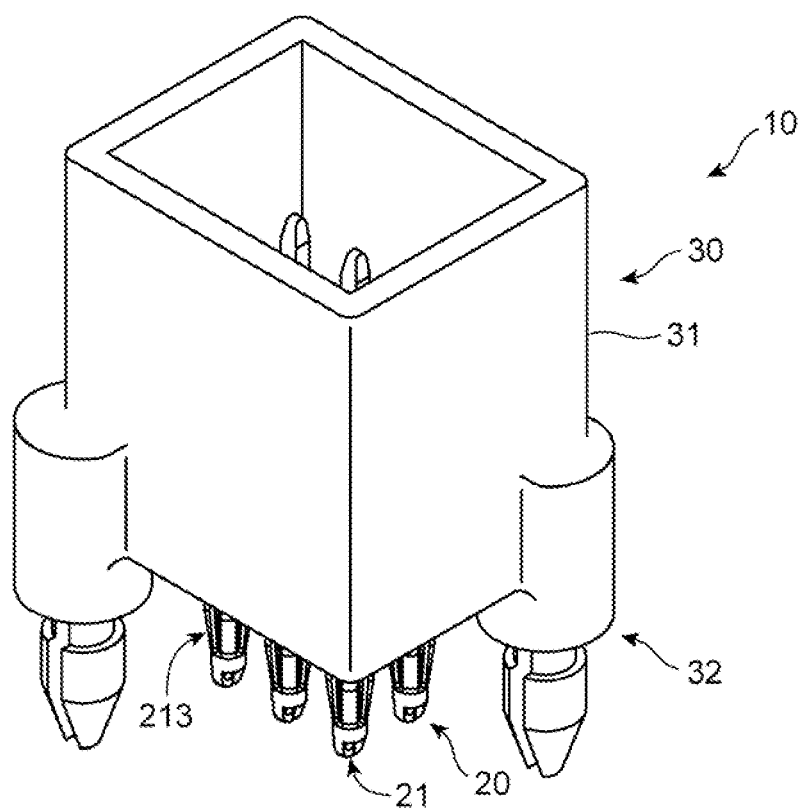
FIG. 1 is an upper perspective view of the electric connector in accordance with the first embodiment of the present invention.
Figure 2:
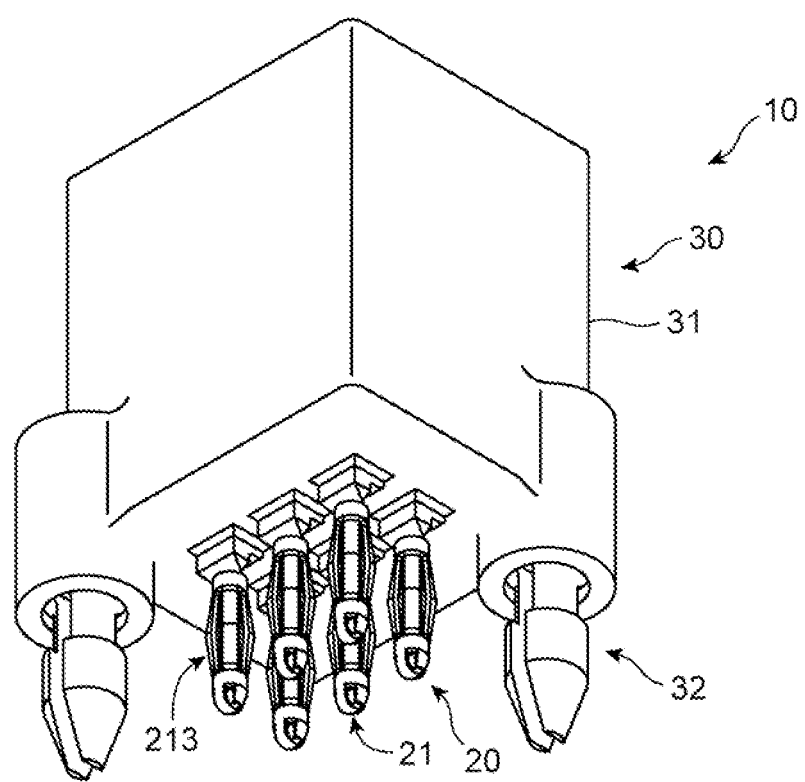
FIG. 2 is a lower perspective view of the electric connector in accordance with the first embodiment of the present invention.
Figure 3:
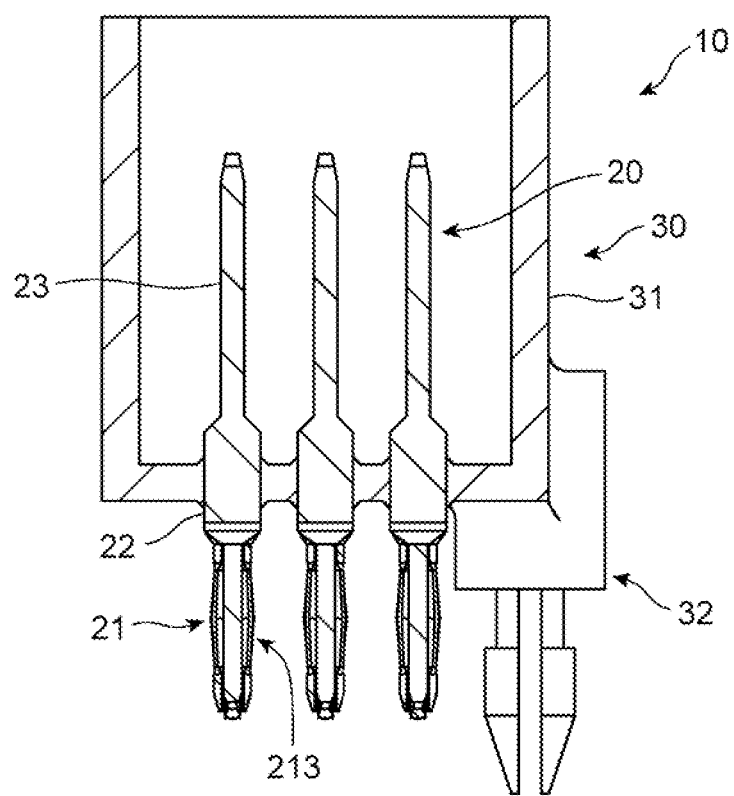
FIG. 3 is a cross-sectional view of the electric connector in accordance with the first embodiment of the present invention, taken along a longer edge thereof.
Figure 4:
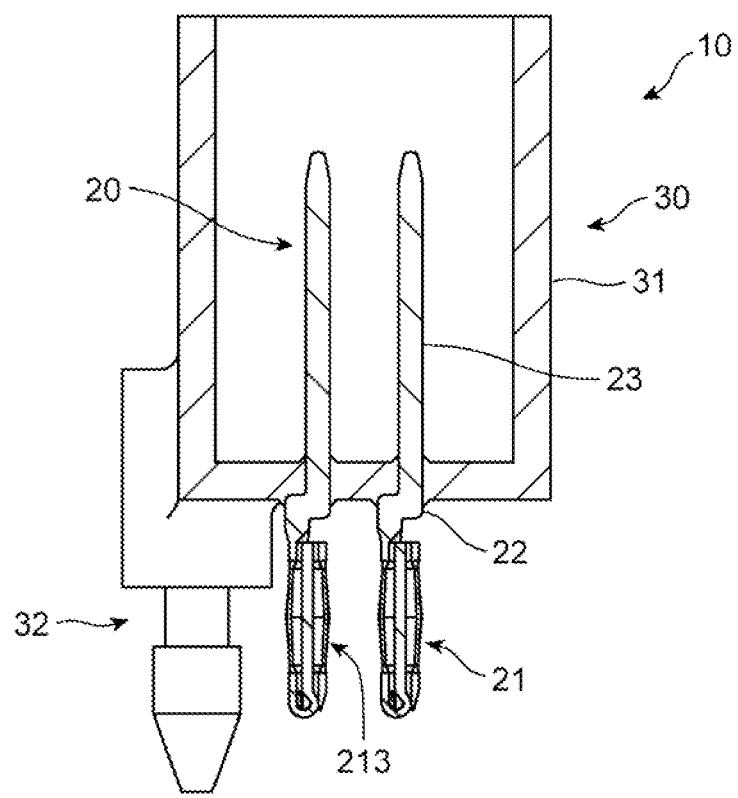
FIG. 4 is a cross-sectional view of the electric connector in accordance with the first embodiment of the present invention, taken along a shorter edge thereof.
Figure 5:
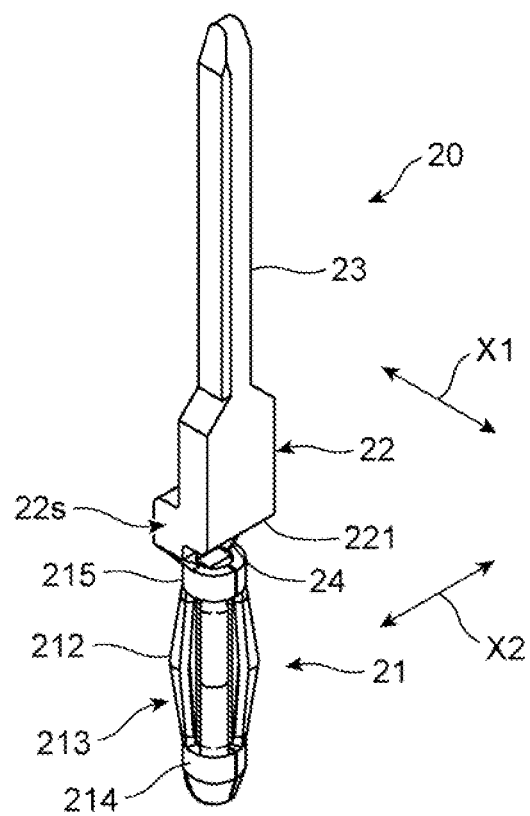
FIG. 5 is a perspective view of the connector terminal defining a part of the electric connector in accordance with the first embodiment of the present invention.
Figure 6:
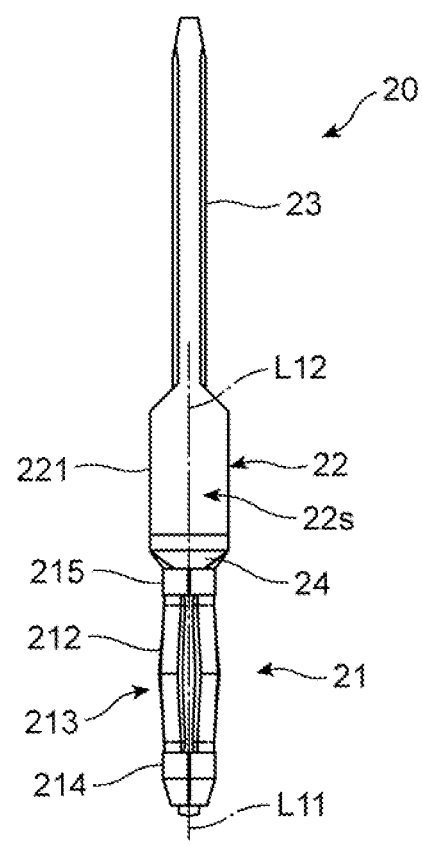
FIG. 6 is a front view of the connector terminal illustrated in FIG. 5.

The connector terminal 20 illustrated in FIGS. 5 to 7 includes a press-fit terminal 21 to be inserted into a through-hole formed through a printed circuit board, a shaft portion 22, a pin portion 23 to be inserted into a female terminal of another electric connector, and an adjustment portion 24 situated between the shaft portion 22 and the press-fit terminal 21.

The press-fit terminal 21 is formed at an end of the connector terminal 20, and can be electrically connected to a printed circuit board without being soldered to the printed circuit board. The press-fit terminal 21 includes a central shaft portion 211 having a U-shaped cross-section (see FIGS. 8A to 8C), a contact section 213 including a plurality of V-shaped contact pieces 212 equally spaced away from adjacent ones, and a pair of C-shaped binders 214 and 215. Each of the contact pieces 212 extends in a longitudinal direction of the central shaft portion 211, and outwardly protrudes at a center thereof such that the contact pieces 212 surround the central shaft portion 211 therewith. The contact section 213 is in the form of a barrel around the central shaft portion 211 can elastically increase and decrease an outer diameter thereof.

The binders 214 and 215 surround the central shaft portion 211 therewith at opposite ends of the central shaft portion 211.

The shaft portion 22 is formed between the press-fit terminal 21 and the pin portion 23. The shaft portion 22 has a lateral cross-section having a size entirely covering therewith a lateral cross-section of the press-fit terminal 21 when viewed in an axial direction of the connector terminal 20. Specifically, the shaft portion 21 is formed by bending a portion 221 in a thickness-wise direction X1 of the connector terminal 21. The portion 221 is designed to have a width greater than an outer diameter of the press-fit terminal 21 in a width-wise direction X2 of the connector terminal 21. Hence, the shaft portion 22 can have a thickness greater than the outer diameter of the press-fit terminal 21 by bending the portion 221 in the thickness-wise direction X1.

As illustrated in FIGS. 5 to 7, the shaft portion 22 includes a first portion 2211 formed so as to be L-shaped by bending the portion 221 in the thickness-wise direction X1, and a second portion 2212 formed so as to be L-shaped by further bending the first portion 2221 into an L-shape. As a result, the shaft portion 22 is in the form of a crank.

The shaft portion 22 has continuous surface 22s around an imaginary center line L12 thereof. Specifically, the shaft portion 22 has the surfaces 22s extending in an axial direction of the connector terminal 20 at an entire circumference thereof.

Figure 10:
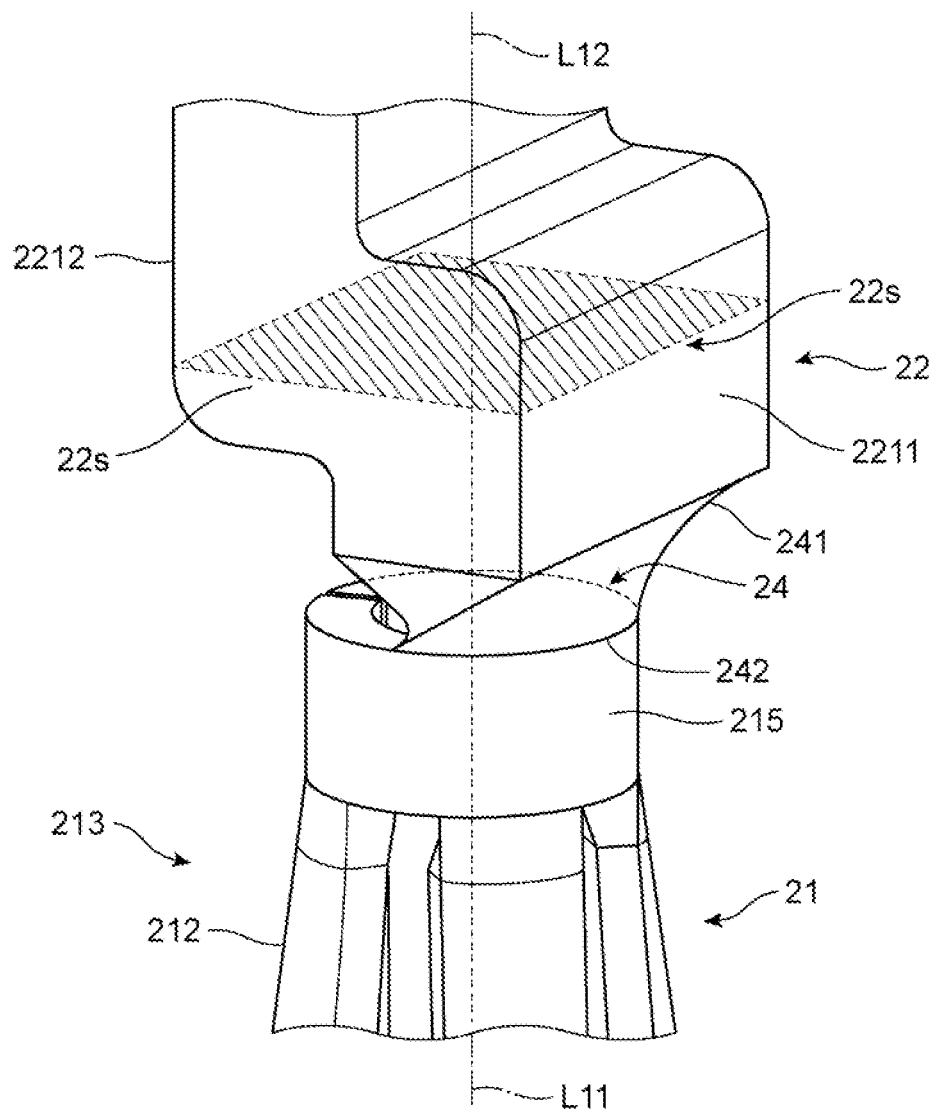
FIG. 10 is an enlarged perspective view of the shaft portion of the connector terminal.

As illustrated in FIG. 10, the imaginary center line L12 of the shaft portion 22 passes through a center between the first portion 2211 and the second portion 2212. Accordingly, the imaginary center line L12 of the shaft portion 22 is not concentric with an imaginary center line of the pin portion 23.

As illustrated in FIGS. 5 to 7, the pin portion 23 defines a terminal having a needle-shaped top.

The adjustment portion 24 is designed deformable in a plane perpendicular to the axial direction of the connector terminal 20. Specifically, the adjustment portion 24 can be shifted or deformed in a direction perpendicular to an imaginary center line L11 of the press-fit terminal 21, and further, towards the second portion 2212 of the shaft portion 22. By so shifting the adjustment portion 24, it is possible to axially align the imaginary center line L11 of the press-fit terminal 21 and the imaginary center line L12 of the shaft portion 22 with each other.

As illustrated in FIGS. 1 to 4, the housing 30 includes a main body 31 in the form of a rectangular parallelepiped box and open at a top thereof, and a pair of legs 32 located on a diagonal line of the main body 31. The housing 30 is fixed to a printed circuit board by inserting the legs 32 into through-holes formed through the printed circuit board. The main body 31 is formed at a bottom thereof with six through-holes (not illustrated). The connector terminals 20 are inserted into the through-holes such that the pin portions 23 protrude into a space formed in the main body 31, and the press-fit terminals 21 protrude outwardly through the bottom of the main body 31.

Hereinbelow is explained a method of fabricating the electric connector 10 having the above-mentioned structure, in accordance with the first embodiment, with reference to the drawings.

First, a method of fabricating the connector terminal 20 is explained with reference to FIGS. 8A to 8C and 10.

Figure 8A:
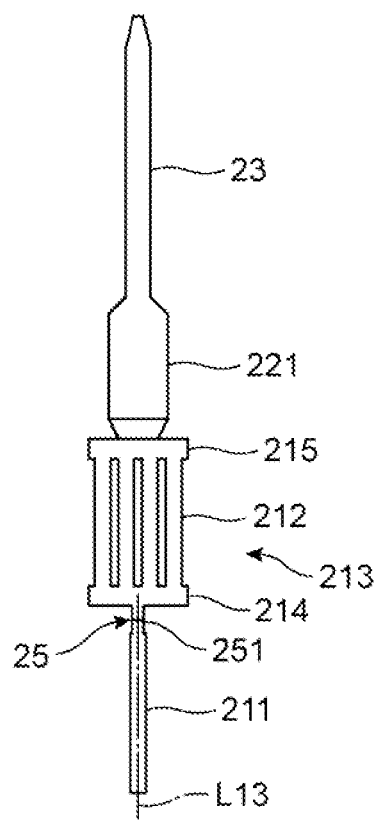
FIG. 8A is a plan view of a metal sheet of which the connector terminal illustrated in FIG. 5 is fabricated.
Figure 8B:
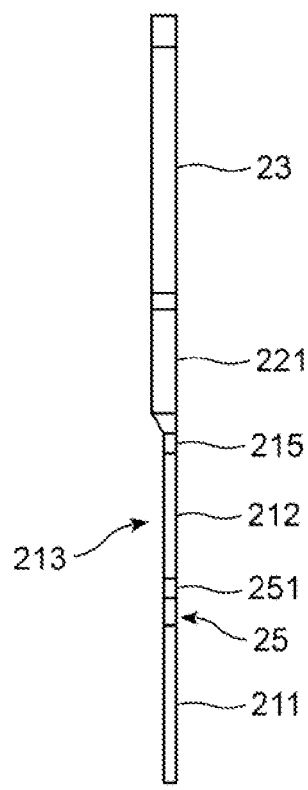
FIG. 8B is a side view of the metal sheet illustrated in FIG. 8A.

The connector terminal 20 is fabricated by bending a single metal sheet illustrated in FIGS. 8A and 8B.

First, a metal sheet is punched into such a shape as illustrated in FIG. 8A. The central shaft portion 211 and the contact section 213 are pressed to be thinner than the pin portion 23 and the portion 221.

Figure 8C:
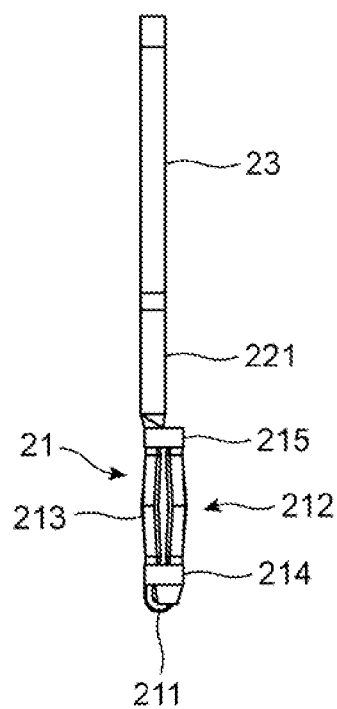
FIG. 8C is a side view of the metal sheet illustrated in FIG. 8A, with a press-fit terminal being fabricated of a part of the metal sheet.

Then, as illustrated in FIG. 8C, the U-shaped central shaft portion 211 is folded by 180 degrees towards the contact section 213 around a folding position 251 included in a folding portion 25 (see FIG. 8A) situated between the central shaft portion 211 and the contact section 213. The folding portion 25 extends perpendicularly to a longitudinal center line of the metal sheet.

Then, the binders 214 and 215 defined by edges of the contact section 213 extending perpendicularly to an imaginary center line L13 are bent into a C-shape, and the contact pieces 212 extending in parallel with the imaginary center line L13 are bent in such a manner that the contact section 213 forms a barrel surrounding the central shaft portion 211 therewith.

Thus, there is completed the press-fit terminal 21.

Figure 9:
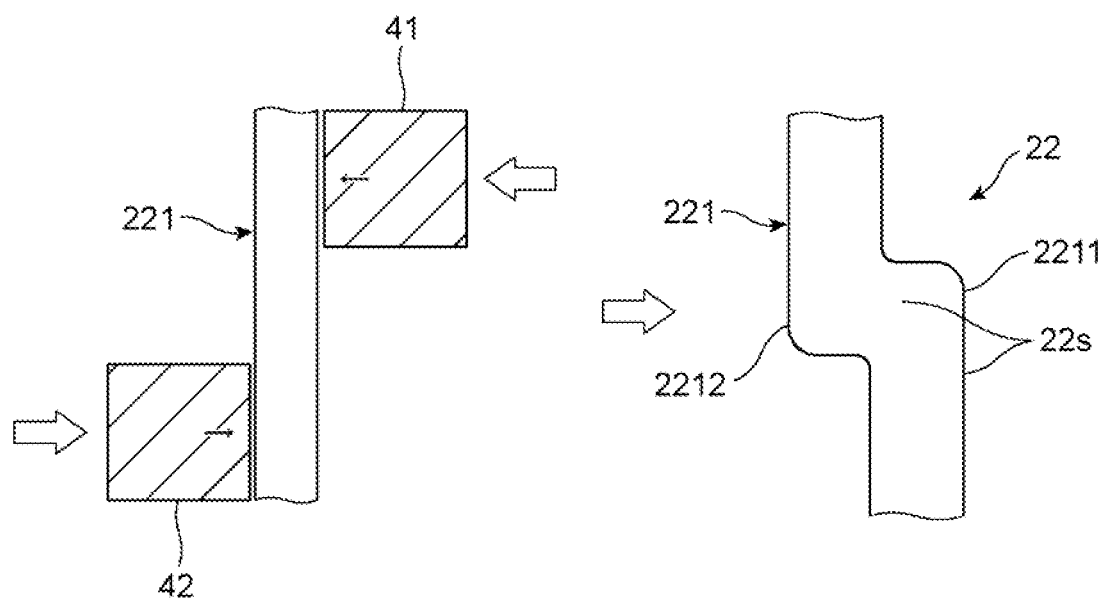
FIG. 9 illustrates a step of forming the shaft portion of the connector terminal illustrated in FIG. 5.

Then, as illustrated in FIG. 9, the portion 221 is pressed at one end (located closer to the pin portion 23) thereof by a first die 41 and at the other end (located closer to the press-fit terminal 21) thereof by a second die 42, resulting in that the portion 221 which is flat is bent into a crank.

Since the portion 221 has a width wider than an outer diameter of the press-fit terminal 21 in the width-wise direction, by causing the portion 221 to be thicker than an outer diameter of the press-fit terminal 21, the shaft portion 22 has circumferential surfaces 22s having a rectangular lateral cross-section.

Then, as illustrated in FIG. 7, the positional relation between the press-fit terminal 21 and the shaft portion 22 is adjusted by deforming the adjustment portion 24 such that the imaginary center line L11 of the press-fit terminal 21 and the imaginary center line L12 of the shaft portion 22 are concentric with each other.

The shaft portion 22 is formed in a shape of a crank by bending a metal sheet at an end located adjacent to the press-fit terminal 21, towards a certain direction. The binders 214 and 215 are bent in the direction in which the shaft portion 22 is bent, into an arcuate shape or a C-shape. Thus, the press-fit terminal 21 is shifted, by deforming the adjustment portion 24, into a direction towards the second portion 2212 of the shaft portion 22 and perpendicular to the imaginary center line L11 of the press-fit terminal 21 to thereby cause the imaginary center line L11 of the press-fit terminal 21 and the imaginary center line L12 of the shaft portion 22 to be concentric with each other.

Specifically, as illustrated in FIG. 10, the adjustment portion 24 is twisted from a linear edge 241 towards an arcuate edge 242 located adjacent to the binder 215 to thereby allow the imaginary center lines L11 and L12 to be concentric with each other.

Thus, there is completed the connector terminal 20 illustrated in FIGS. 5 to 7.

Figure 11:
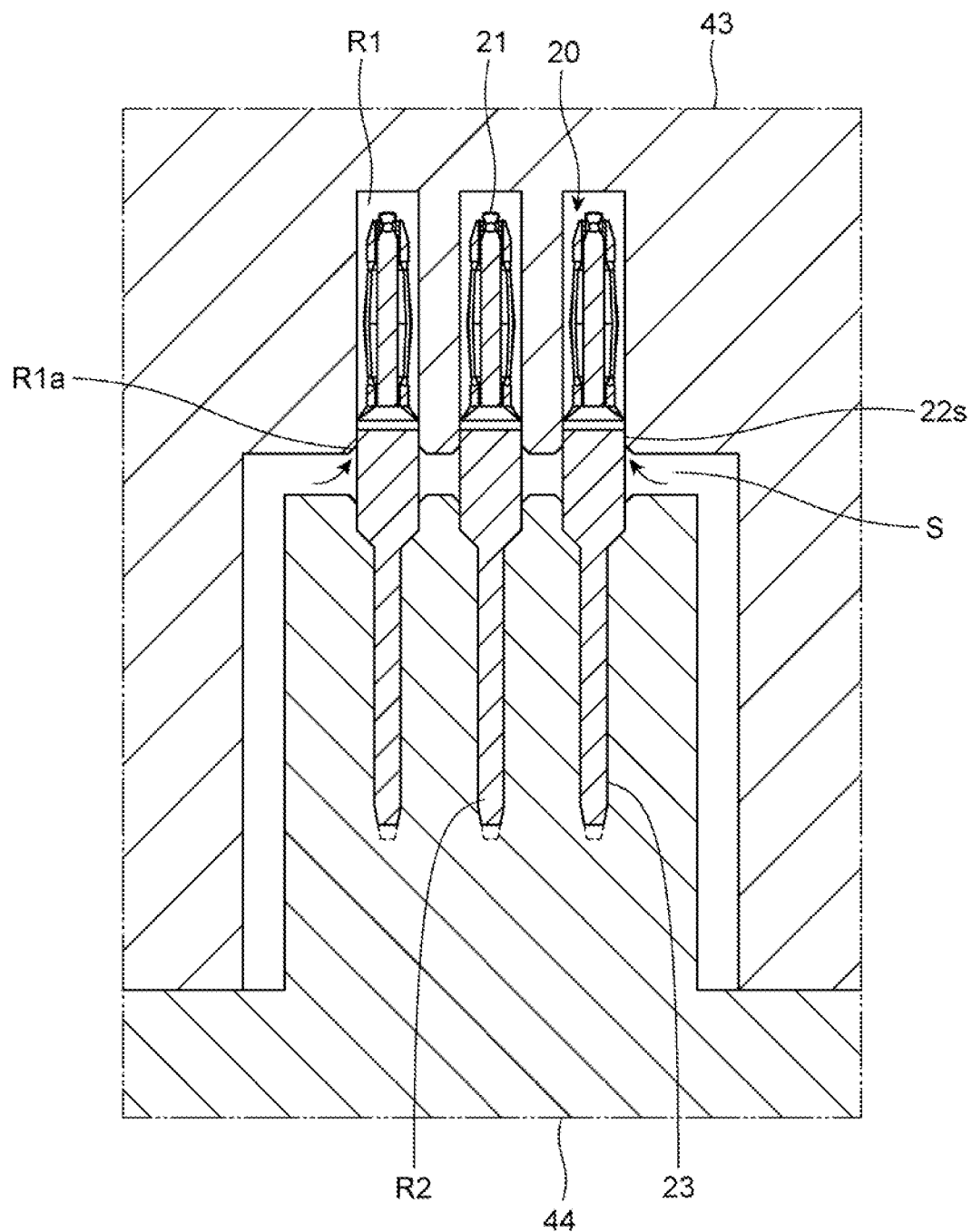
FIG. 11 is a cross-sectional view of the connector terminal and a die used for fabricating a housing of the electric connector in accordance with the first embodiment.
Figure 12:
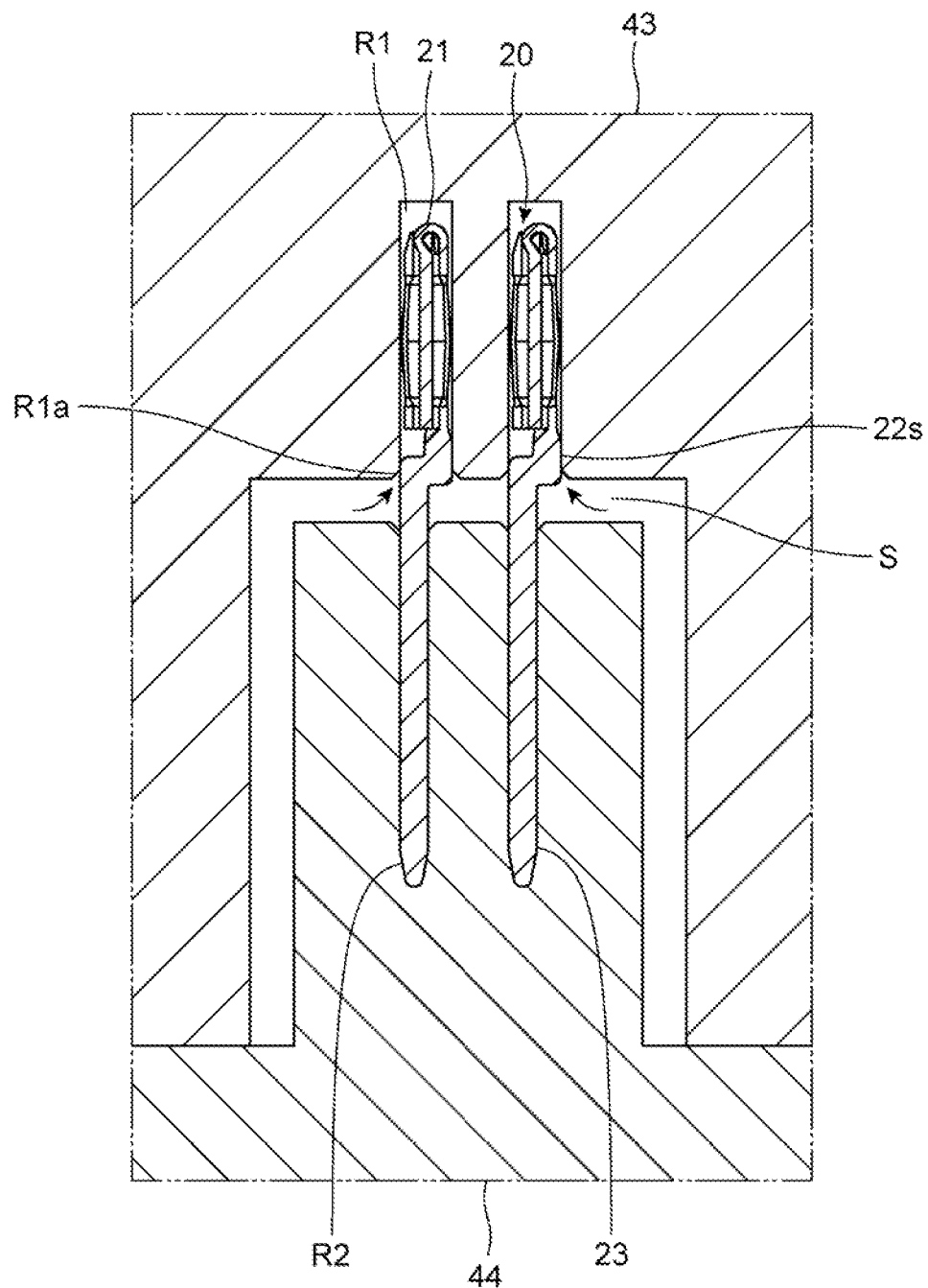
FIG. 12 is a cross-sectional view of the connector terminal and a die used for fabricating a housing of the electric connector in accordance with the first embodiment.
Figure 13:
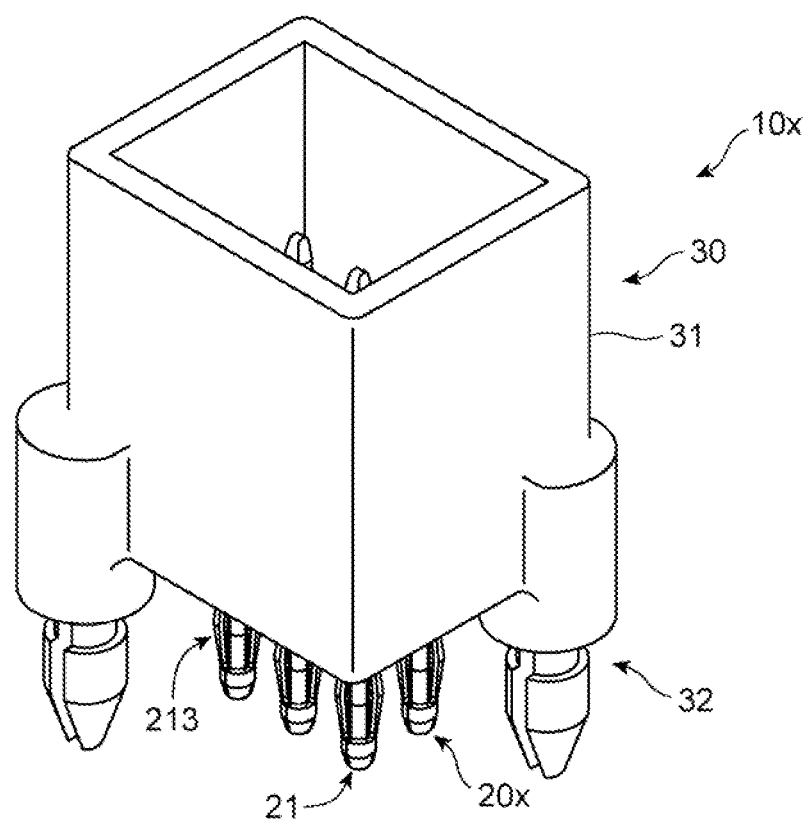
FIG. 13 is an upper perspective view of the electric connector in accordance with the second embodiment of the present invention.
Figure 14:
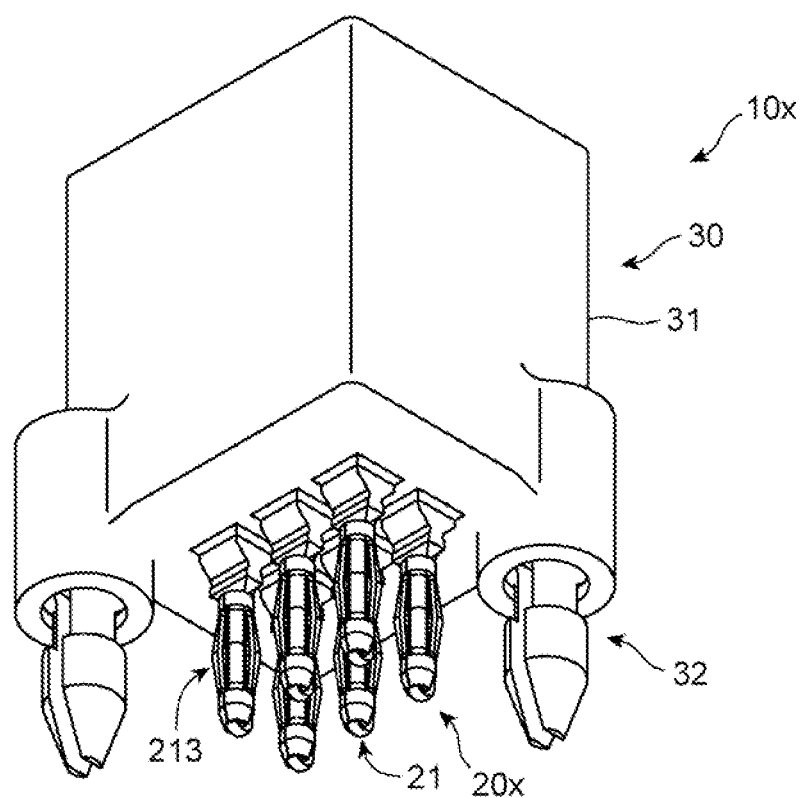
FIG. 14 is a lower perspective view of the electric connector in accordance with the second embodiment of the present invention.
Figure 15:
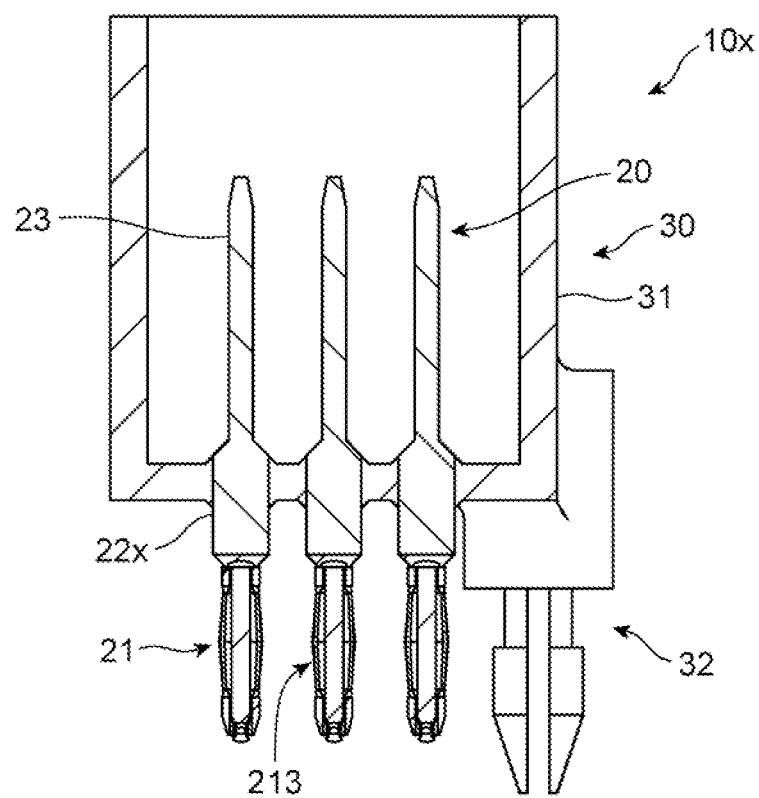
FIG. 15 is a cross-sectional view of the electric connector in accordance with the second embodiment of the present invention, taken along a longer edge thereof.
Figure 16:
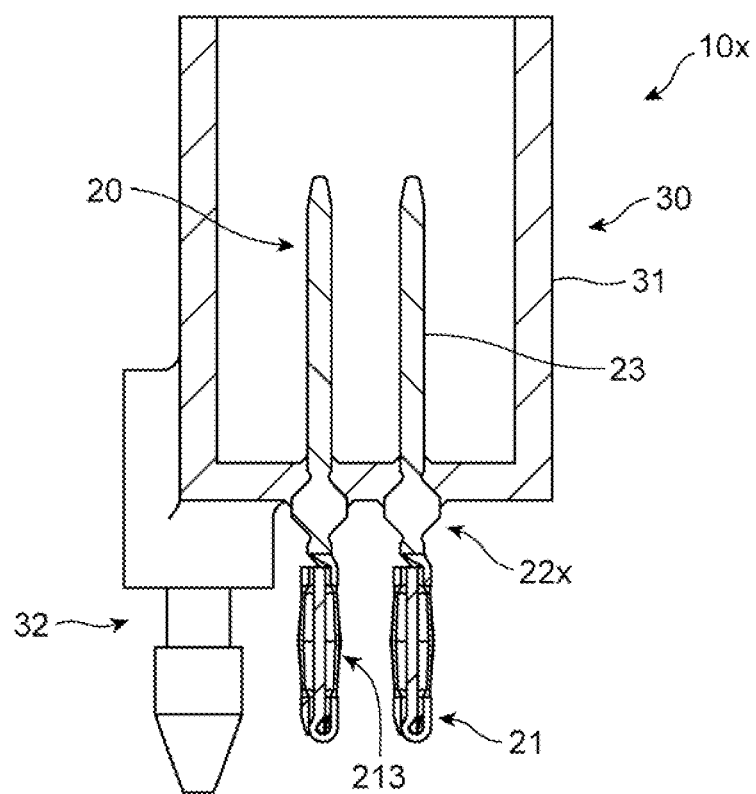
FIG. 16 is a cross-sectional view of the electric connector in accordance with the second embodiment of the present invention, taken along a shorter edge thereof.

Then, as illustrated in FIGS. 11 and 12, the connector terminal 20 is housed in first and second dies 43 and 44 used for molding the housing 30 with resin by an insertion molding process. Between the first and second dies 43 and 44 is formed a space S in which resin is to be filled for making the housing 30.

The first die 43 is formed with first terminal spaces R1 in which the press-fit terminals 21 are housed. The lateral cross-section of the shaft portion 22 is designed to be identical in shape with a lateral cross-section of the first terminal space R1 of the first die 43. Accordingly, inserting the press-fit terminal 21 into the first terminal space R1, the first terminal space R1 is entirely closed by the circumferential surfaces 22s of the shaft portion 22.

The second die 44 is formed with second terminal spaces R2 in which the pin portions 23 are housed.

Housing the press-fit terminals 21 of the connector terminal 20 in the first terminal spaces R1 of the first die 43, the circumferential surfaces 22s of the shaft portion 22 make close contact with inner surfaces of the first terminal spaces R1 at opening edges R1a of the first terminal spaces R1. Since the shaft portion 22 has the lateral cross-section identical in shape with the lateral cross-section of the first terminal space R1, the shaft portion 22 entirely covers the first terminal space R1 therewith, and hence, the first terminal space R1 is made closed by the shaft portion 22. Accordingly, when the housing 30 is molded with resin, it is possible to prevent the resin filling the space S therewith from penetrating the first terminal spaces R1.

Since the shaft portion 22 is designed to have a lateral cross-section having a size entirely covering therewith a lateral cross-section of the press-fit terminal 21 when viewed in an axial direction of the connector terminal 20, the first terminal spaces R1 in which the press-fit terminals 21 each having the contact pieces 212 expanded into a barrel shape are housed can be closed by the shaft portion 22.

While the shaft portion 22 is inserted into the first terminal space R1, since the shaft portion 22 is formed entirely circumferentially with the circumferential surfaces 22s and the circumferential surfaces 22s make close contact with an inner surface of the first terminal space R1, the shaft portion 22 is not deformed by a pressure of the resin filled in the space S, ensuring that a gap is not formed between the shaft portion 22 and the inner surface of the first terminal space R1. Thus, the connector terminal 20 is able to prevent the resin from penetrating the first terminal space R1, and hence, it is possible to prevent generation of resin burr on the press-fit terminal 21 caused by the penetration of the resin into the first terminal space R1.

Filling resin in the space S formed between the first and second dies 43 and 44, there is fabricated the housing 30 fixedly supporting the connector terminals 20 and having the same shape as that of the space S.

In the first embodiment, the portion 221 is bent in a thickness-wise direction thereof to define the first and second portions 2211 and 2212 both cooperating with each other to define a crank, resulting in that the shaft portion 22 is made thicker. The shaft portion 22 can be readily made thicker by carrying out simple steps.

Even if the imaginary center line L11 of the press-fit terminal 21 were made not coaxial with the imaginary center line L12 of the shaft portion 22, when the shaft portion 22 is bent into a crank to make the shaft portion 22 thicker, the adjustment portion 24 situated between the shaft portion 22 and the press-fit terminal 21 can be deformed to thereby allow the imaginary center lines L11 and L12 to be coaxial with each other.

Second Embodiment

The electric connector in accordance with the second embodiment is explained hereinbelow with reference to FIGS. 13 to 24. Parts or elements that correspond to those of the first embodiment illustrated in FIGS. 1 to 12 have been provided with the same reference numerals, and operate in the same manner as corresponding parts or elements in the first embodiment, unless explicitly explained hereinbelow.

The electric connector 10x in accordance with the second embodiment is characterized in that the shaft portion 22x of the connector terminal 20x is formed thicker by increasing a thickness of a part of the portion 221.

As illustrated in FIGS. 13 to 16, the electric connector 10x in accordance with the second embodiment includes six connector terminals 20x arranged in the housing 30 in two rows each including three connector terminals 20x in a line, similarly to the electric connector 10 in accordance with the first embodiment.

Figure 17:
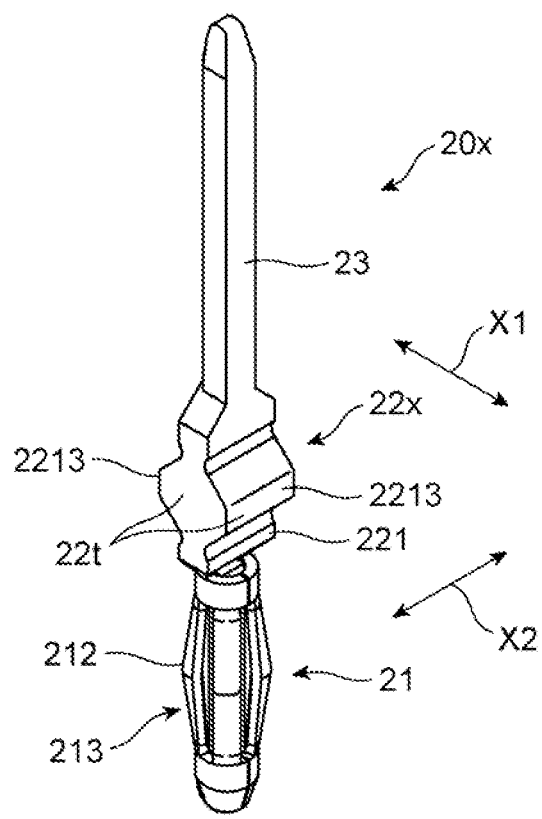
FIG. 17 is a perspective view of the connector terminal defining a part of the electric connector in accordance with the second embodiment of the present invention.
Figure 18:
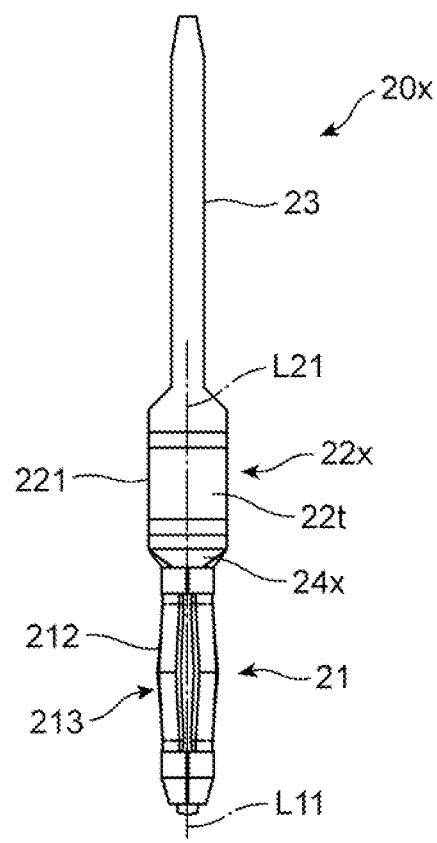
FIG. 18 is a front view of the connector terminal illustrated in FIG. 17.
Figure 19:
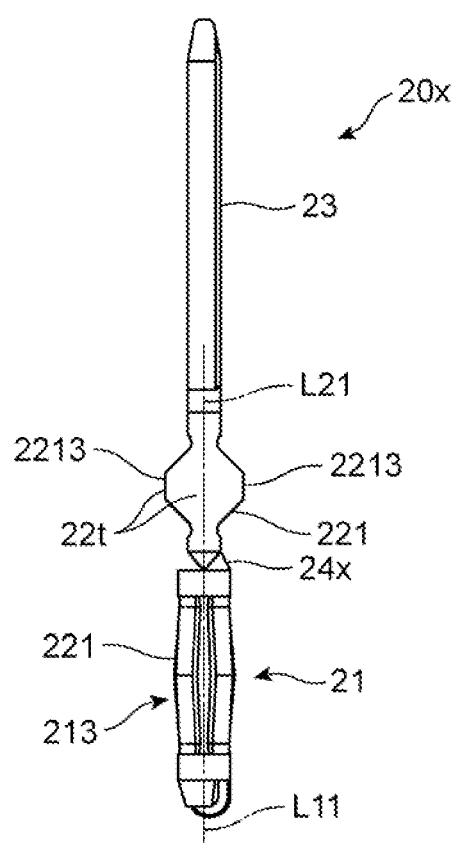
FIG. 19 is a right side view of the connector terminal illustrated in FIG. 17.

As illustrated in FIGS. 17 to 19, the connector terminal 20x is designed to include a shaft portion 22x between the press-fit terminal 21 and the pin portion 23. The shaft portion 22x includes a portion 221 having a length greater than an outer diameter of the press-fit terminal 21 in a width-wise direction X2, and having a thickness greater than an outer diameter of the press-fit terminal 21 in a thickness-wise direction X1. The portion 221 has a thickness greater than an outer diameter of the press-fit terminal 21 in a thickness-wise direction X1, by shifting a thickness at opposite ends towards a center.

A method of fabricating the connector terminal 20x is explained hereinbelow.

Figure 21:
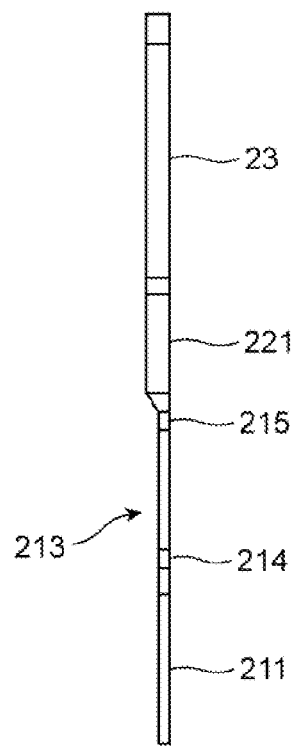
FIG. 21 is a side view of a metal sheet of which the connector terminal illustrated in FIG. 17 is fabricated.
Figure 22:
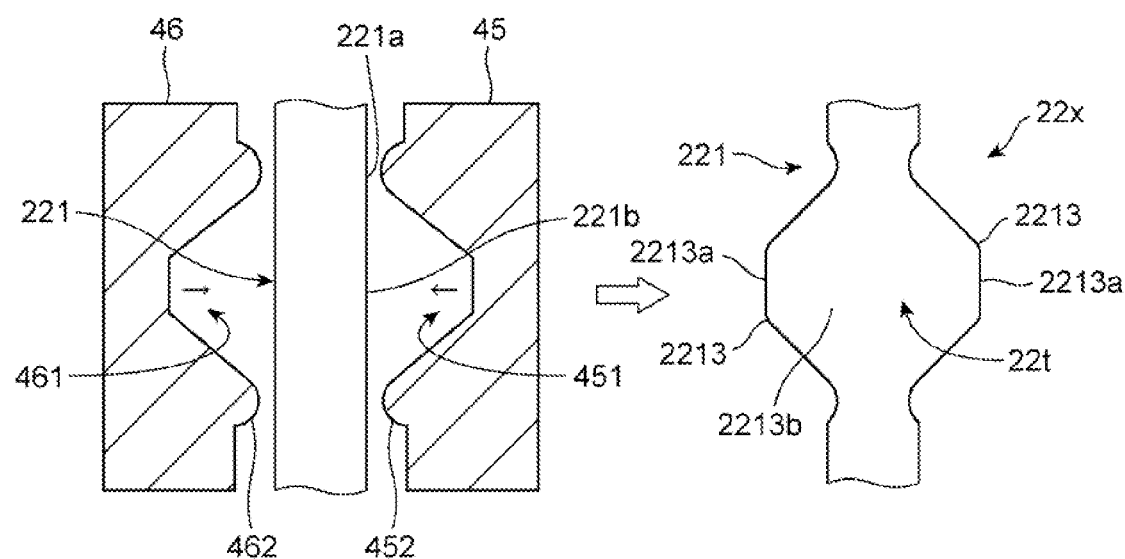
FIG. 22 illustrates a step of forming the shaft portion of the connector terminal illustrated in FIG. 17.

The connector terminal 20x is fabricated by bending a single metal sheet illustrated in FIGS. 21 and 22.

Figure 20:
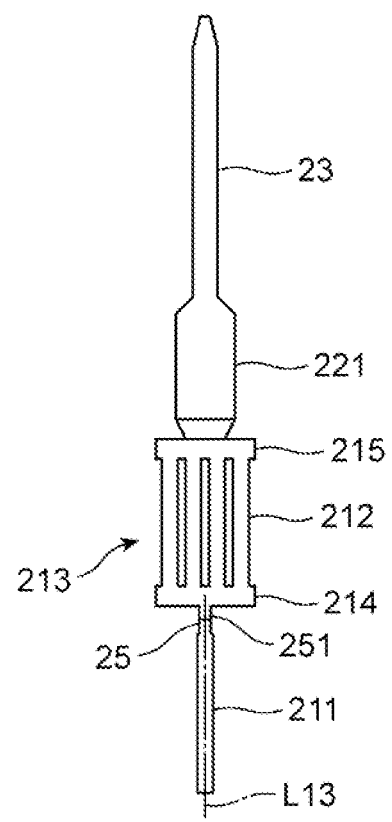
FIG. 20 is a plan view of a metal sheet of which the connector terminal illustrated in FIG. 17 is fabricated.

First, a metal sheet is punched into such a shape as illustrated in FIG. 20. Then, similarly to the first embodiment, a rectangular folding portion 25 situated between the central shaft portion 211 and the contact section 213 is folded by 180 degrees towards the contact section 213 around a folding position 251 included in the rectangular portion 25 and extending perpendicularly to an imaginary center line L13 of the central shaft portion 211. Then, the binders 214 and 215 defined by edges of the contact section 213 extending perpendicularly to the imaginary center line L13 are bent into a C-shape in such a manner that the contact section 213 forms a barrel surrounding the central shaft portion 211 therewith.

Thus, there is completed the press-fit terminal 21.

Then, as illustrated in FIG. 22, the portion 221 is sandwiched between a first die 45 and a second die 46. The first and second dies 45 and 46 are formed with recesses 451 and 461, respectively, for shifting a thickness at opposite ends 221a of the portion 221 to a center 221b of the portion 221. At peripheral edges of the recesses 451 and 461 are formed protrusions 452 and 462, respectively, for being inserted into the portion 221 to thereby increase a thickness at the center 221b.

The portion 221 is sandwiched between the first and second dies 45 and 46, and then, compressed by them to thereby allow the protrusions 452 and 462 to penetrate the portion 221. A thickness of the portion 221 compressed by the protrusions 452 and 462 is shifted into the recesses 451 and 461. The portion 221 is further compressed by the first and second dies 45 and 46 to cause a thickness of the opposite ends 221a of the portion 221 to be filled in the recesses 451 and 461, resulting in that the recesses 451 and 461 are filled with a thickness of the portion 221, and thus, raised portions 2213 are formed at opposite surfaces of the portion 221. Thus, there is completed the shaft portion 22x having a length greater than an outer diameter of the press-fit terminal 21 in both the thickness-wise direction X1 and the width-wise direction X2. The circumferential surfaces 22t of the portion 221 are defined by tops 2213a of the raised portions 2213 and sidewalls 2213b of the raised portions 2213.

Then, as illustrated in FIG. 19, the adjustment portion 24x is deformed to thereby alter the positional relation between the press-fit terminal 21 and the shaft portion 22x. Specifically, the adjustment portion 24x is twisted to cause the imaginary center line L11 of the press-fit terminal 21 and an imaginary center line L21 of the shaft portion 22x to be axial with each other.

The imaginary center line L21 passes a center of the shaft portion 22x made thicker by the raised portions 2213 added to the portion 221.

The shaft portion 22x in the second embodiment is raised towards opposite sides about the imaginary center line L21. The binders 214 and 215 are formed by bending a metal sheet into an arcuate shape or a C-shape. Thus, the press-fit terminal 21 is shifted in a direction opposite to a direction in which the binders 214 and 215 are bent, and perpendicular to the imaginary center line L11 of the press-fit terminal 21, to thereby cause the press-fit terminal 21 and the shaft portion 22x to be axial with each other.

By shifting the press-fit terminal 21 in the above-mentioned manner to thereby cause the press-fit terminal 21 and the shaft portion 22x to be axial with each other, it is further possible to allow the imaginary center line L11 of the press-fit terminal 21 to be axial with an imaginary center line (not illustrated) of the pin portion 23.

Figure 23:
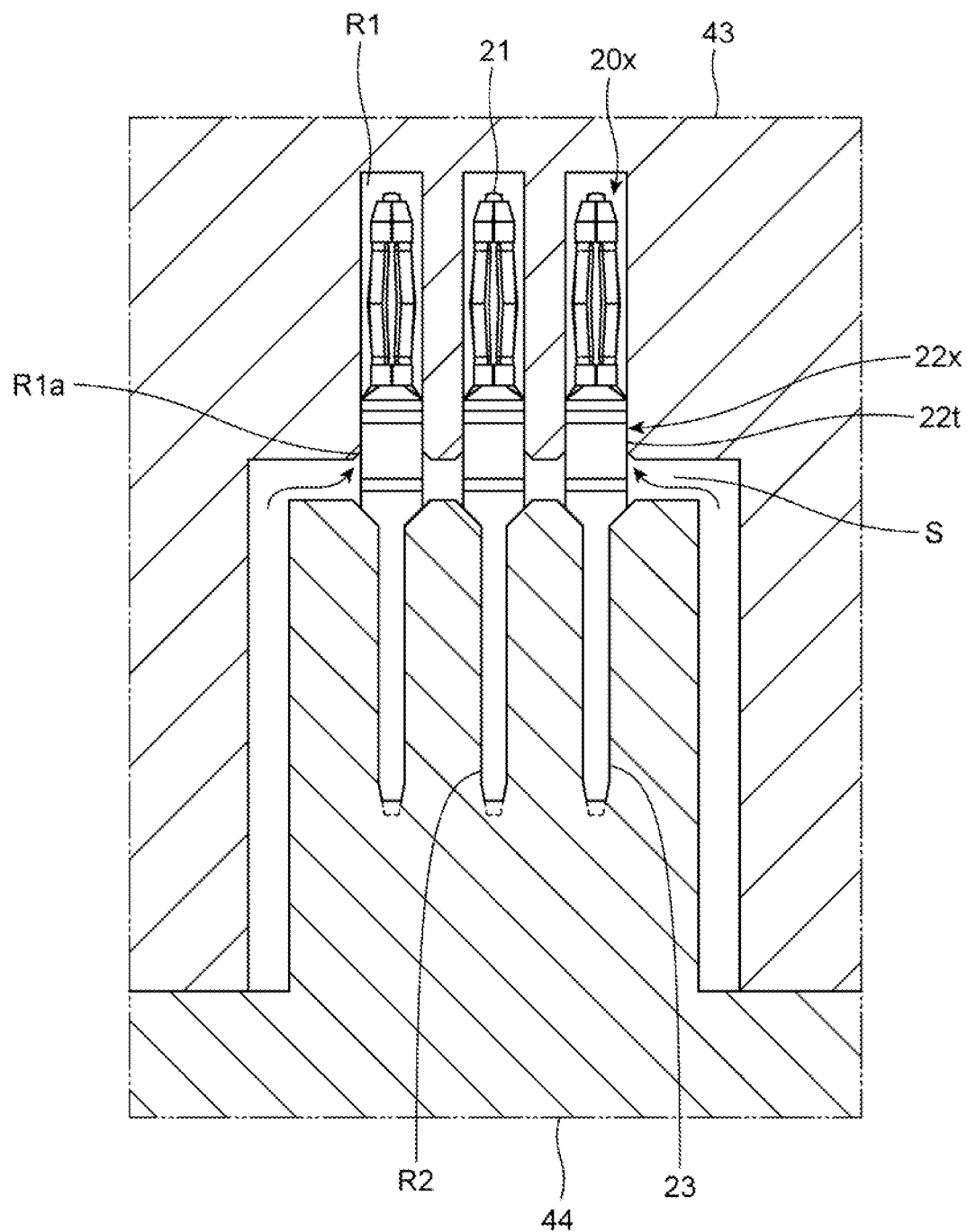
FIG. 23 is a cross-sectional view of the connector terminal and a die used for fabricating a housing of the electric connector in accordance with the second embodiment.
Figure 24:
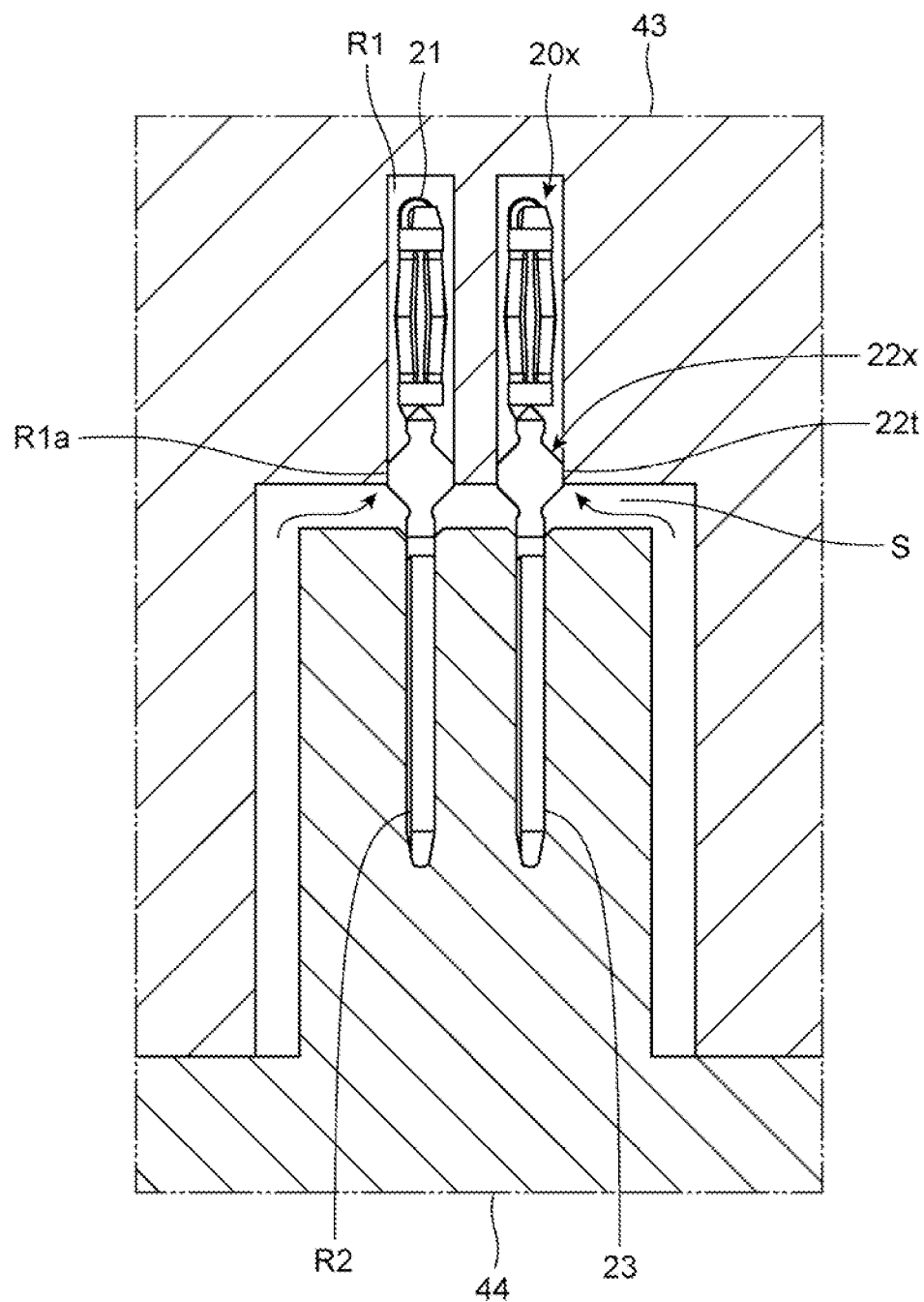
FIG. 24 is a cross-sectional view of the connector terminal and a die used for fabricating a housing of the electric connector in accordance with the second embodiment.
Figure 25:
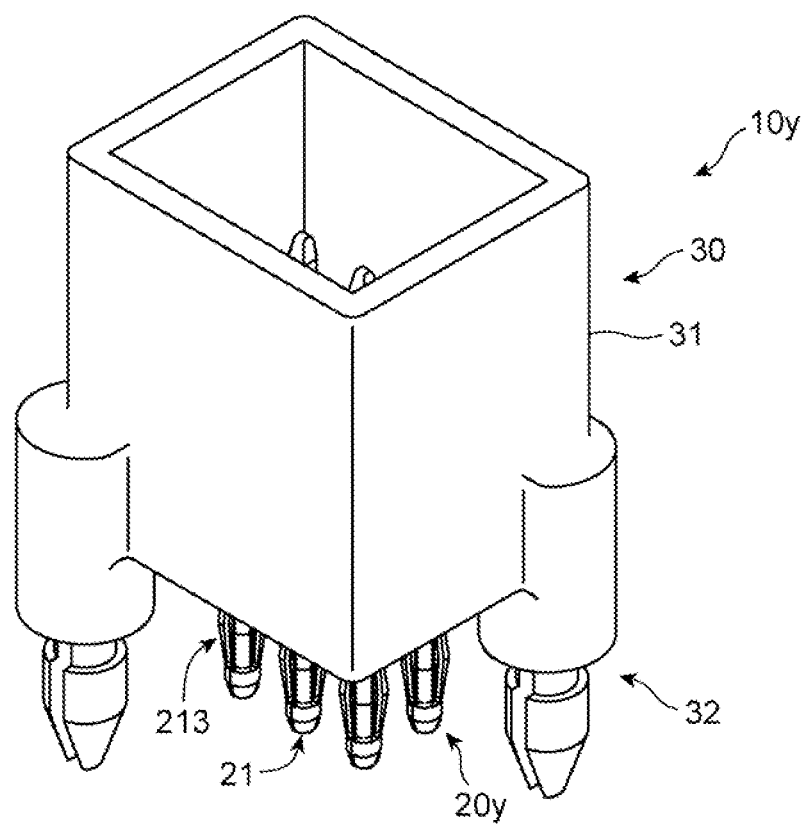
FIG. 25 is an upper perspective view of the electric connector in accordance with the third embodiment of the present invention.
Figure 26:
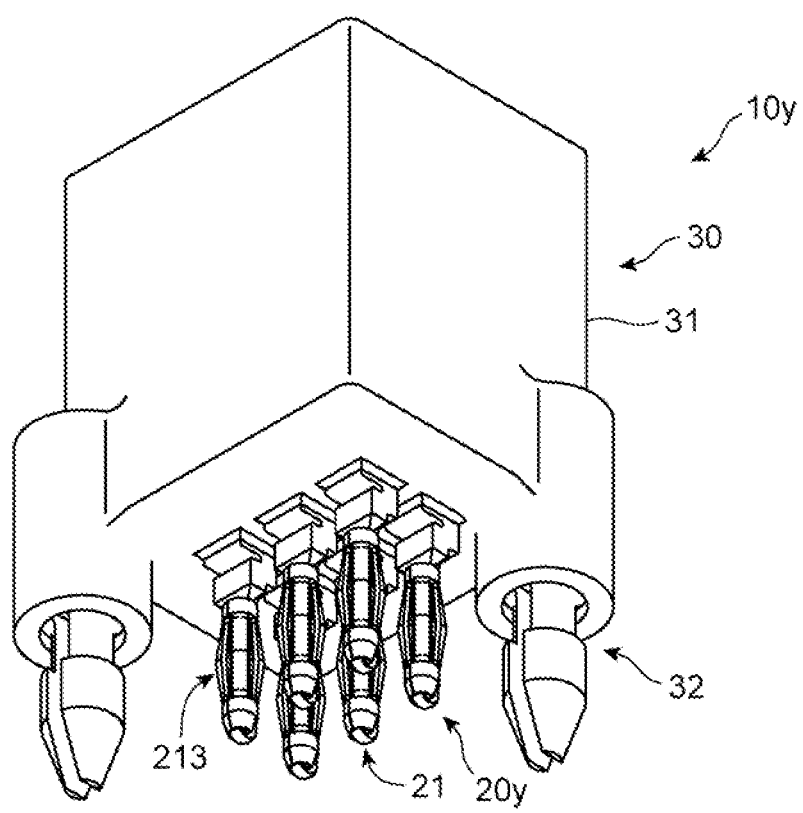
FIG. 26 is a lower perspective view of the electric connector in accordance with the third embodiment of the present invention.
Figure 27:
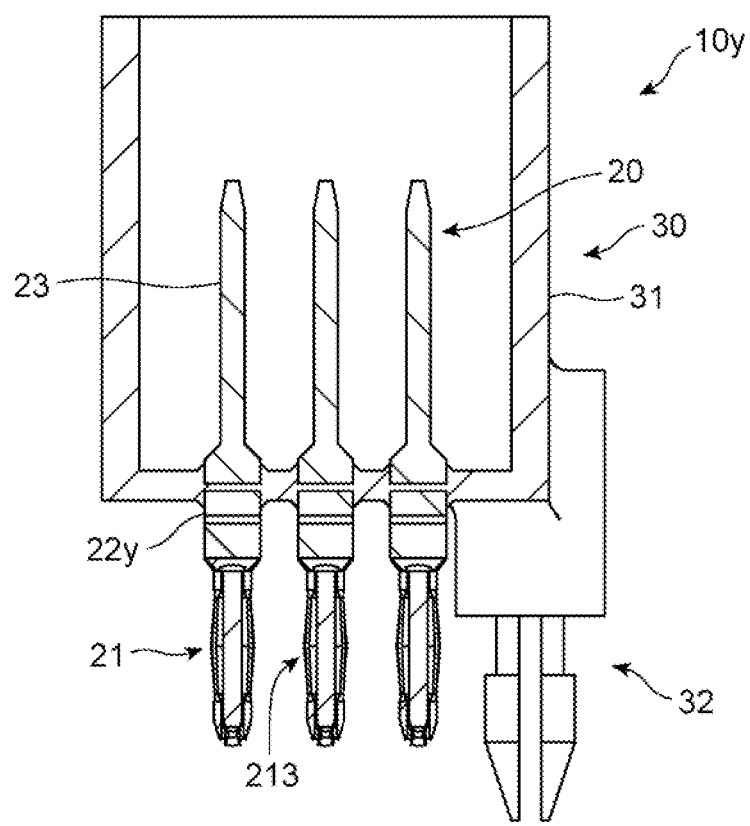
FIG. 27 is a cross-sectional view of the electric connector in accordance with the third embodiment of the present invention, taken along a longer edge thereof.
Figure 28:
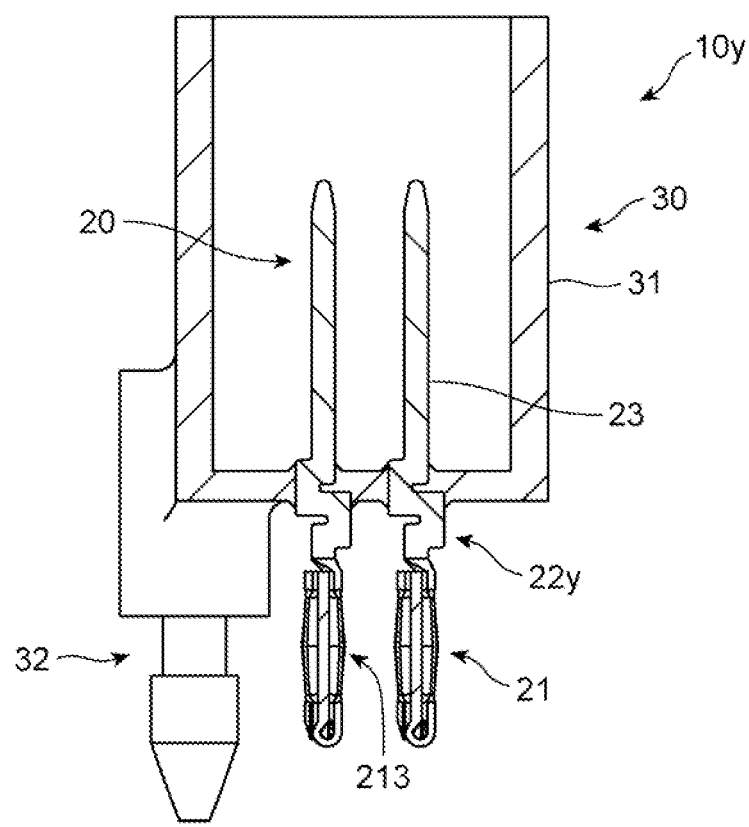
FIG. 28 is a cross-sectional view of the electric connector in accordance with the third embodiment of the present invention, taken along a shorter edge thereof.

As illustrated in FIGS. 23 and 24, the connector terminals 20 are sandwiched between and compressed by the first and second dies 43 and 44.

The lateral cross-section of the shaft portion 22x is designed to be identical in shape with the lateral cross-section of the first terminal space R1 of the first die 43. Accordingly, inserting the press-fit terminal 21 into the first terminal space R1, the first terminal space R1 is entirely closed by the circumferential surfaces 22t of the shaft portion 22x. Accordingly, when the housing 30 is molded with resin, it is possible to prevent the resin filling the space S therewith from penetrating the first terminal spaces R1.

The shaft portion 22x having the circumferential surfaces 22t can be formed by shifting a thickness at opposite ends towards a center of the portion 221, instead of bending the portion 221. Since the shaft portion 22x is formed entirely circumferentially with the circumferential surfaces 22t, and the circumferential surfaces 22t make close contact with an inner surface of the first terminal space R1, the shaft portion 22x is not deformed by a pressure of the resin filled in the space S, ensuring that there is not formed a gap between the shaft portion 22x and the inner surface of the first terminal space R1. Thus, the connector terminal 20 is able to prevent the resin from penetrating the first terminal space R1, and hence, it is possible to prevent generation of resin burr on the housing 30, by virtue of the connector terminals 20 each including the shaft portion 22x.

Even if the imaginary center line L11 of the press-fit terminal 21 were made not coaxial with an imaginary center line L21 of the shaft portion 22x, when a thickness at the opposite ends 221a is shifted towards the center 221b of the portion 221 to make the shaft portion 22x thicker, the adjustment portion 24 situated between the shaft portion 22x and the press-fit terminal 21 can be deformed to thereby allow the imaginary center lines L11 and L21 to be coaxial with each other.

In the second embodiment, a thickness of a certain part of the portion 221 is shifted towards another part of the portion 221 to thereby form the shaft portion 22x thicker. As an alternative, portions of a metal sheet from which the central shaft portion 211, the contact section 213, and the pin portion 23 are fabricated may be made thinner than the rest. In other words, the shaft portion 22x may be formed by making a part or all of the portion 211 thinner than the rest.

Third Embodiment

The electric connector in accordance with the third embodiment is explained hereinbelow with reference to FIGS. 25 to 36. Parts or elements that correspond to those of the second embodiment illustrated in FIGS. 13 to 24 have been provided with the same reference numerals, and operate in the same manner as corresponding parts or elements in the first embodiment, unless explicitly explained hereinbelow.

The electric connector in accordance with the third embodiment is characterized in that the shaft portion is formed thicker by being bent by a plurality of times in a thickness-wise direction thereof.

As illustrated in FIGS. 25 to 28, the electric connector 10y in accordance with the third embodiment includes six connector terminals 20y arranged in the housing 30 in two rows each including three connector terminals 20y in a line, similarly to the electric connector 10 in accordance with the first embodiment.

Figure 29:
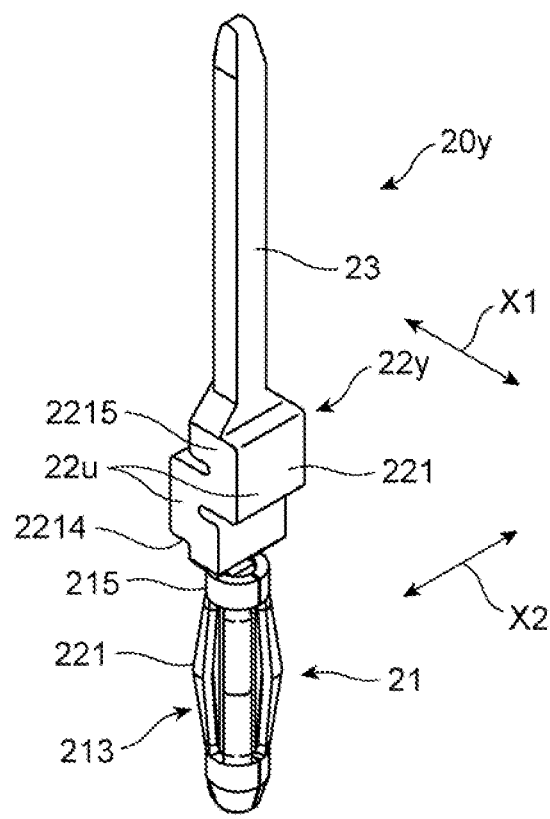
FIG. 29 is a perspective view of the connector terminal defining a part of the electric connector in accordance with the third embodiment of the present invention.
Figure 30:
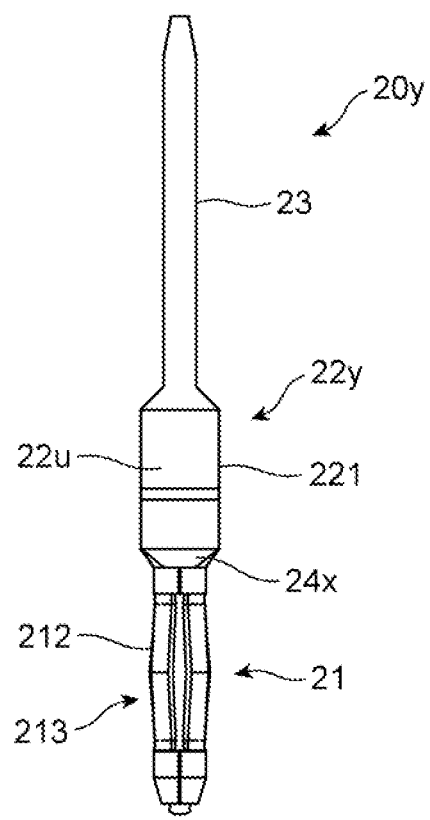
FIG. 30 is a front view of the connector terminal illustrated in FIG. 29.
Figure 31:
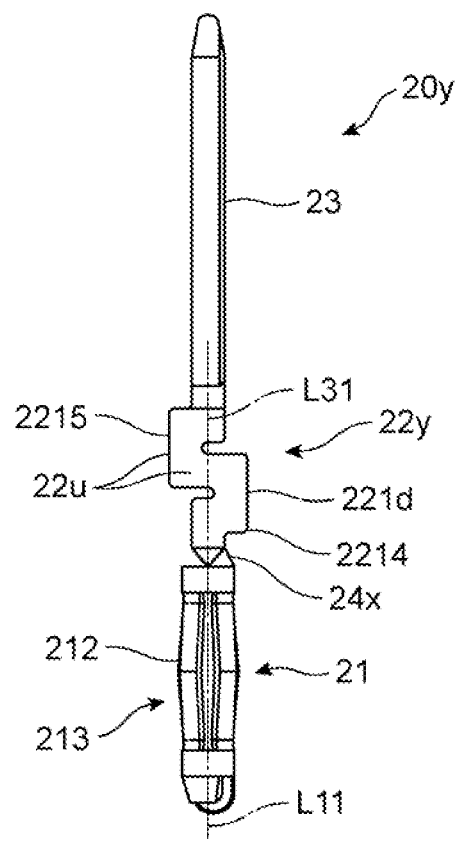
FIG. 31 is a right side view of the connector terminal illustrated in FIG. 29.

As illustrated in FIGS. 29 to 31, the connector terminal 20y includes a shaft portion 22y situated between the press-fit terminal 21 and the pin portion 23. The shaft portion 22y includes the portion 221 having a length greater than an outer diameter of the press-fit terminal 21 in the width-wise direction X2. The portion 221 is bent by a plurality of times in a direction perpendicular to an imaginary center line L31 of the shaft portion 22y such that the portion 221 is zigzag-shaped or wary, to thereby have an increased thickness in the thickness-wise direction X1.

The portion 221 is defined by a first portion 2214 bent J-shaped in a direction in the thickness-wise direction X1, and a second portion 2215 bent J-shaped in the opposite direction. Thus, the portion 221 has a shape defined by a plurality of cranks.

The portion 221 has circumferential surfaces 22u defined by outer surfaces of the first and second portions 2214 and 2215.

A method of fabricating the connector terminal 20y is explained hereinbelow.

Figure 32:
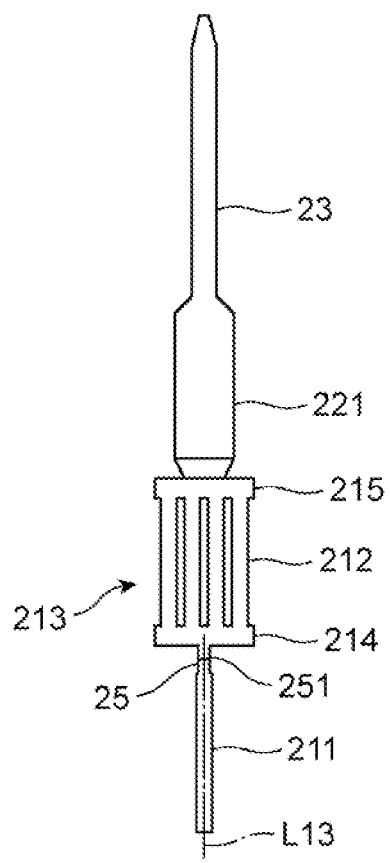
FIG. 32 is a plan view of a metal sheet of which the connector terminal illustrated in FIG. 29 is fabricated.
Figure 33:
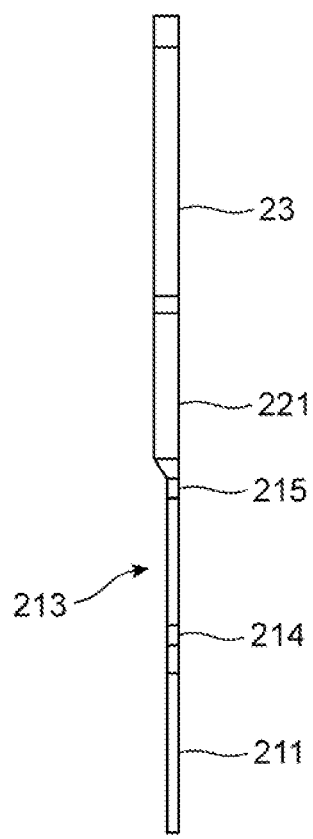
FIG. 33 is a side view of a metal sheet of which the connector terminal illustrated in FIG. 29 is fabricated.

The connector terminal 20y is fabricated by bending a single metal sheet illustrated in FIGS. 32 and 33.

First, a metal sheet is punched into such a shape as illustrated in FIGS. 32 and 33. Then, similarly to the first and second embodiments, the metal sheet illustrated in FIGS. 32 and 33 is bent to form the press-fit terminal 21 including the contact section 213 being in the form of a barrel and surrounding the central shaft portion 211 therewith.

Figure 34:
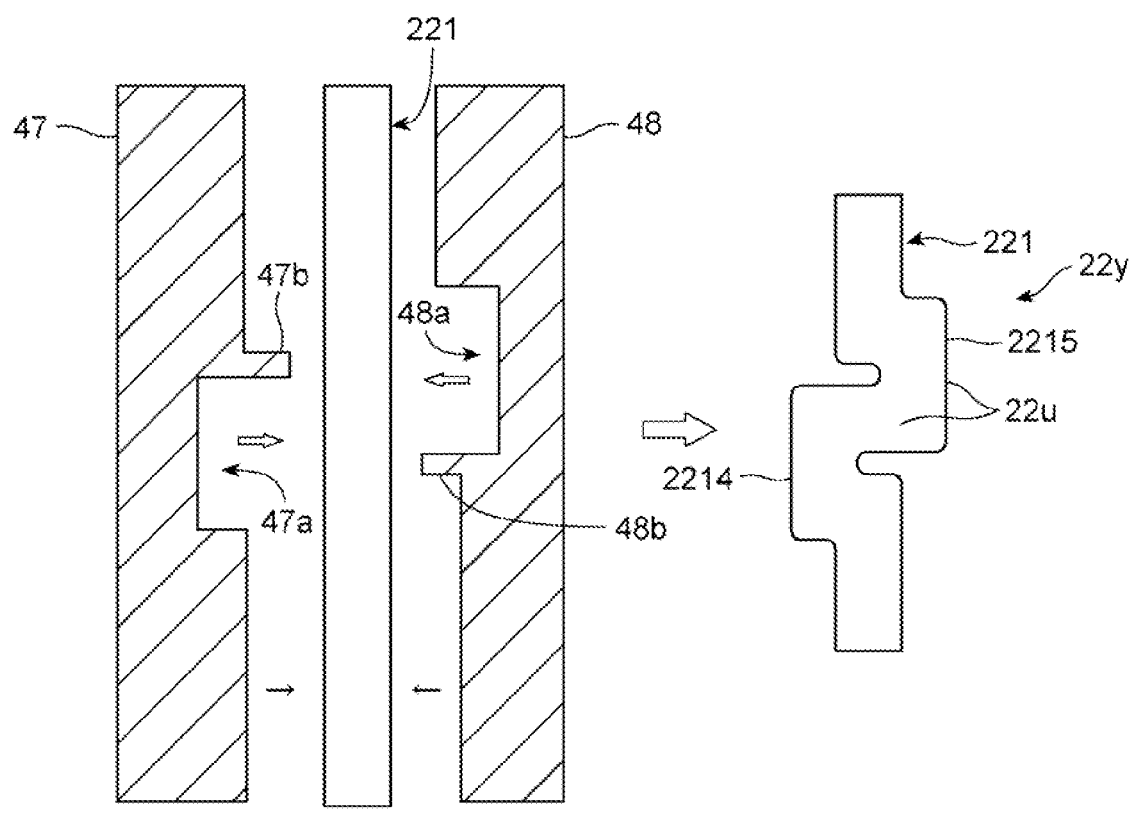
FIG. 34 illustrates a step of forming the shaft portion of the connector terminal illustrated in FIG. 29.

Then, as illustrated in FIG. 34, the portion 221 is sandwiched between a first die 47 and a second die 48. The first die 47 is formed with a recess 47a for fabricating a raised portion of the first portion 2214, and a protrusion 47b for fabricating a recess of the second portion 2215. The second die 48 is formed with a recess 48a for fabricating a raised portion of the second portion 2215, and a protrusion 48b for fabricating a recess of the first portion 2214.

The portion 221 is sandwiched between the first and second dies 47 and 48, and then, compressed by them. The protrusion 47b of the first die 47 and the protrusion 48b of the second die 48 compress the portion 221 in opposite directions, and thus, the portion 221 is partially expanded in opposite directions. The portion 221 is bent into a shape identical with both a space formed in the recess 47a of the first die 47 and a space formed in the recess 48a of the second die 48. Thus, there is formed the portion 221 having a length greater than an outer diameter of the press-fit terminal 21 both in the thickness-wise direction X1 and in the width-wise direction X2.

Then, as illustrated in FIG. 31, the adjustment portion 24x is deformed to thereby adjust the positional relation between the press-fit terminal 21 and the shaft portion 22y. Specifically, the adjustment portion 24x is twisted to cause the imaginary center line L11 of the press-fit terminal 21 and an imaginary center line L31 of the shaft portion 22y to be axial with each other.

The shaft portion 22y in the third embodiment is bent a plurality of times around the imaginary center line L31 in opposite directions perpendicular to the imaginary center line L31, thus the shaft portion 22y having a shape defined by a plurality of cranks. The binders 214 and 215 are bent into an arcuate shape or a C-shape. Thus, the press-fit terminal 21 is shifted, by deforming the adjustment portion 24, into a direction opposite to a direction in which the binders 214 and 215 are bent, and further, perpendicular to the imaginary center line L11 of the press-fit terminal 21 to thereby cause the press-fit terminal 21 and the shaft portion 22y to be axial with each other.

By shifting the press-fit terminal 21 in a direction opposite to the direction in which the binders 214 and 215 are bent to thereby cause the press-fit terminal 21 and the shaft portion 22y to be axial with each other, the imaginary center line L11 of the press-fit terminal 21 and an imaginary center line (not illustrated) of the pin portion 23 can be axial with each other.

Figure 35:
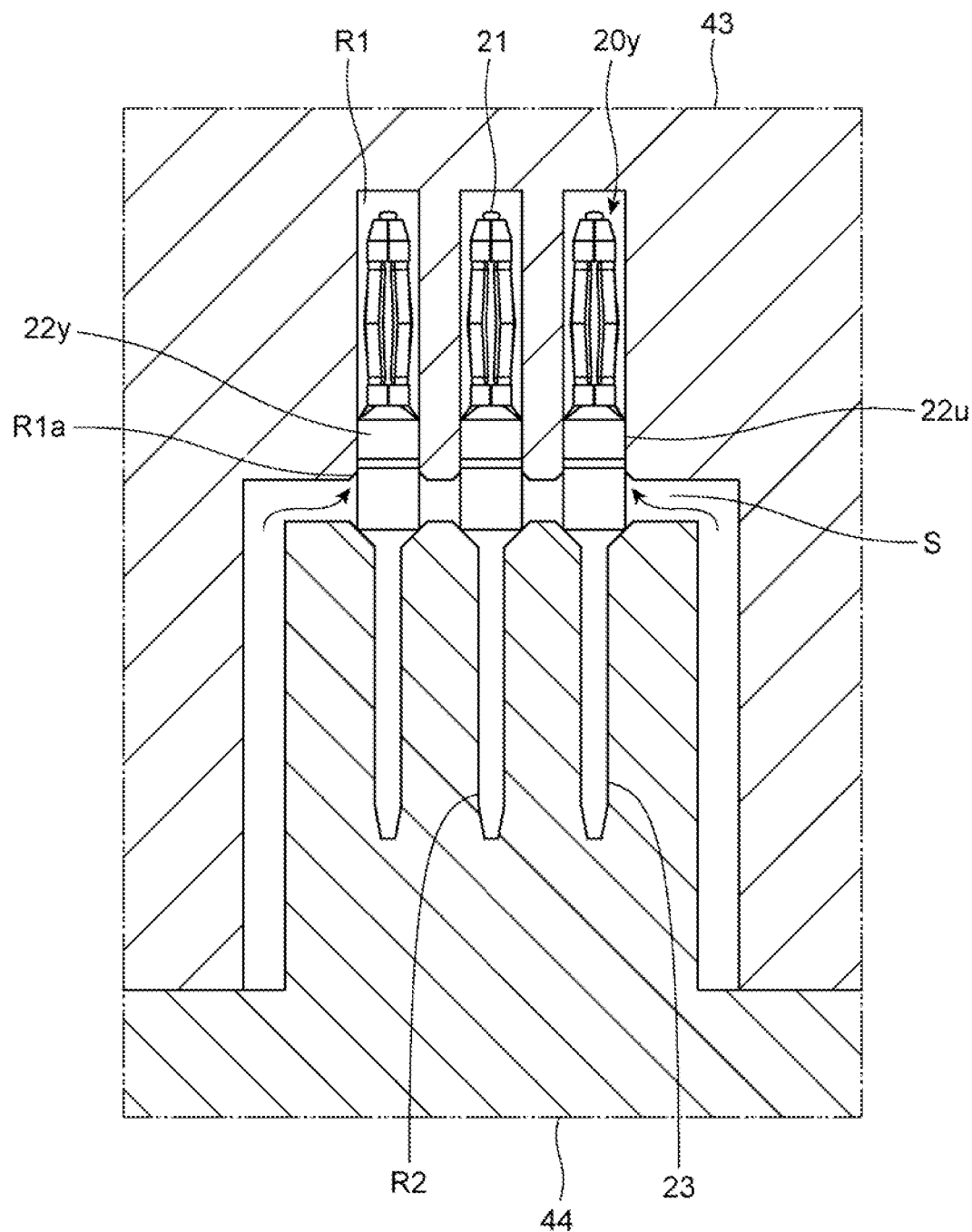
FIG. 35 is a cross-sectional view of the connector terminal and a die used for fabricating a housing of the electric connector in accordance with the third embodiment.
Figure 36:
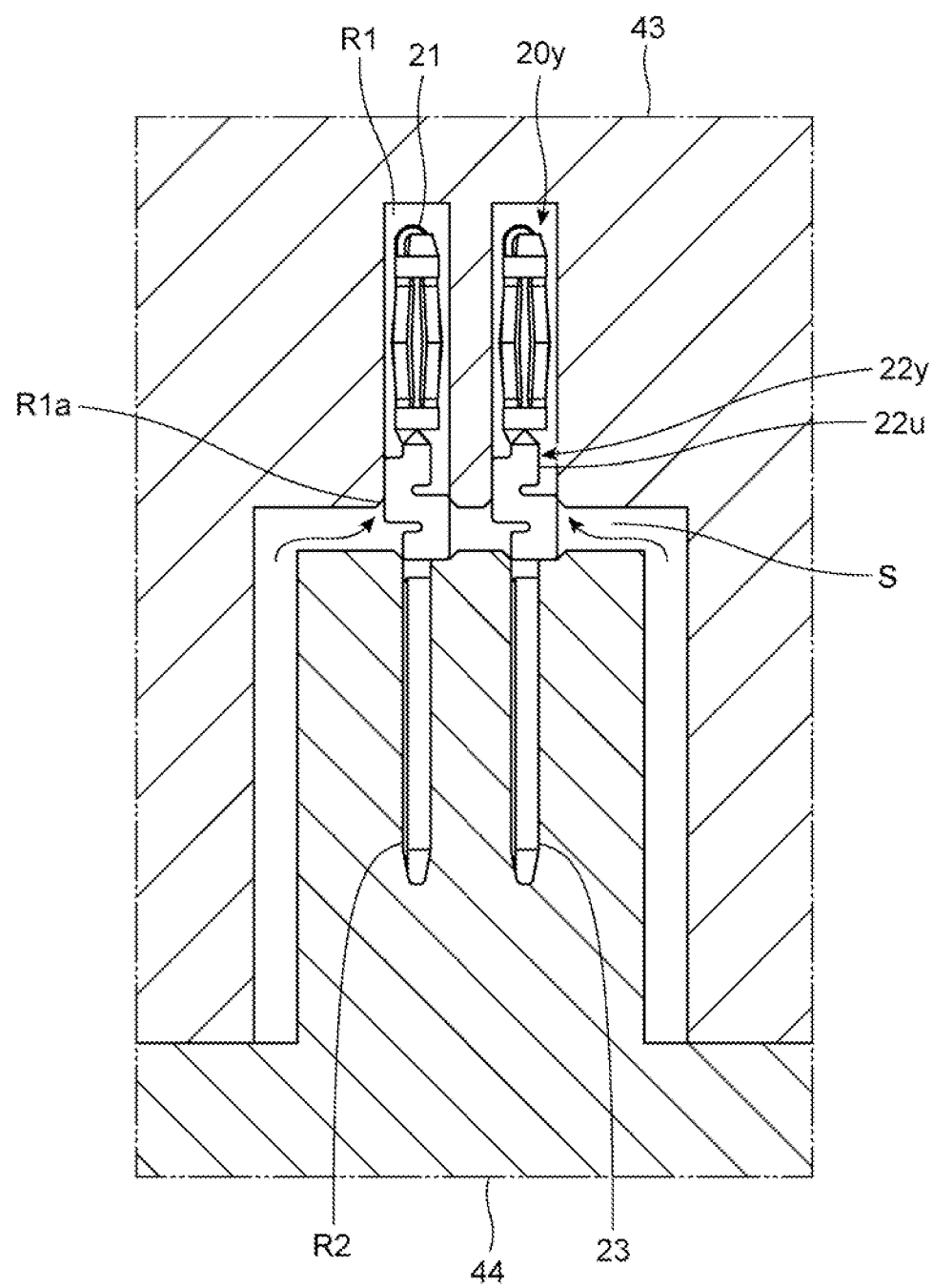
FIG. 36 is a cross-sectional view of the connector terminal and a die used for fabricating a housing of the electric connector in accordance with the third embodiment.

Then, as illustrated in FIGS. 35 and 36, the connector terminals 20y are sandwiched between a first die 43 and a second die 44, and then, compressed by them.

Inserting the press-fit terminals 21 of the connector terminals 20y into the first terminal spaces R1 of the first die 43, the circumferential surfaces 22u of the shaft portion 22y make close contact with inner surfaces of the first terminal spaces R1 to thereby prevent resin from penetrating the first terminal spaces R1 when the housing 30 is molded with resin.

As illustrated in FIG. 29, the shaft portion 22y has a length greater than an outer diameter of the press-fit terminal 21 in the width-wise direction X2. By bending the shaft portion 22y in the thickness-wise direction X1, the shaft portion 22y has the circumferential surfaces 22u as outer surfaces thereof. Since the shaft portion 22y is formed entirely circumferentially with the circumferential surfaces 22u, and the circumferential surfaces 22u make surface contact with an inner surface of the first terminal space R1, the shaft portion 22y is not deformed by a pressure of the resin filled in the space S, ensuring that there is not formed a gap between the shaft portion 22y and the inner surface of the first terminal space R1. Thus, the connector terminal 20y is able to prevent the resin from penetrating the first terminal space R1, and hence, it is possible to prevent generation of resin burr on the housing 30, by virtue of the connector terminals 20y each including the shaft portion 22y.

Furthermore, the resin enters the recesses of the shaft portion 22y formed by the protrusions 47b and 48b of the first and second dies 47 and 48, ensuring that the connector terminals 20y and the housing 30 can be intensively integral with each other.

In the third embodiment, the portion 221 is formed by twice bending a metal sheet, to thereby have the first and second portions 2214 and 2215. As an alternative, the portion 221 may be formed by bending a metal sheet by three or more times to thereby have three or more portions. By designing the portion 221 to have three or more portions, the portion 221 can have an increased area of the circumferential surfaces 22u, ensuring that a frictional force generated between the circumferential surfaces 22u and the inner surfaces of the first terminal spaces R1 can be increased, and hence, the penetration of resin into the first terminal spaces R1 can be surely prevented.

Fourth Embodiment

The electric connector in accordance with the fourth embodiment is explained hereinbelow with reference to FIGS. 37 to 43. Parts or elements that correspond to those of the second embodiment illustrated in FIGS. 17 to 24 have been provided with the same reference numerals, and operate in the same manner as corresponding parts or elements in the first embodiment, unless explicitly explained hereinbelow.

The electric connector in accordance with the fourth embodiment is characterized in that the shaft portion is formed thicker by shifting a thickness in an axial direction thereof to thereby have a diameter greater than an outer diameter of the press-fit terminal 21.

Figure 37:
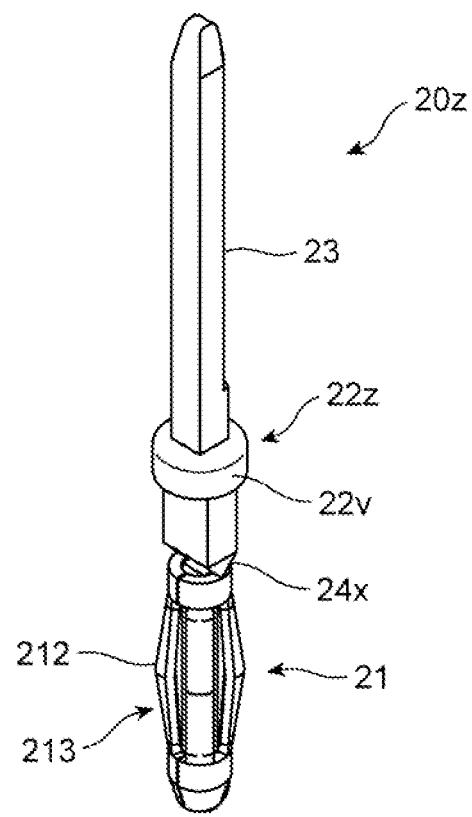
FIG. 37 is a perspective view of the connector terminal defining a part of the electric connector in accordance with the fourth embodiment of the present invention.
Figure 38:
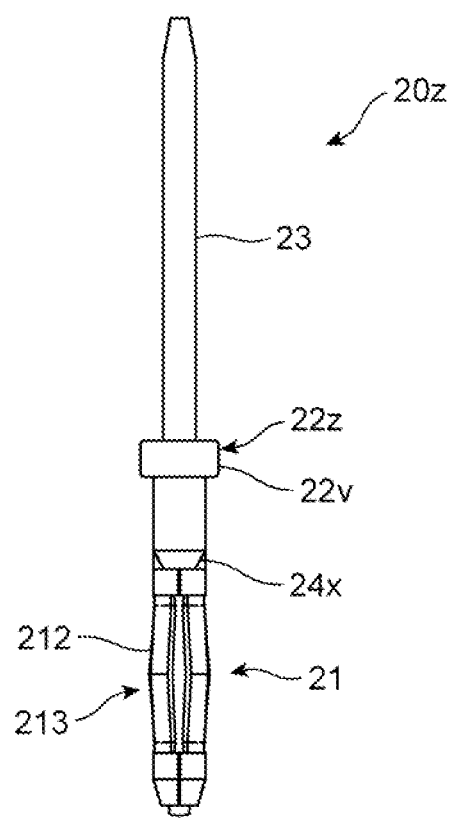
FIG. 38 is a front view of the connector terminal illustrated in FIG. 37.
Figure 39:
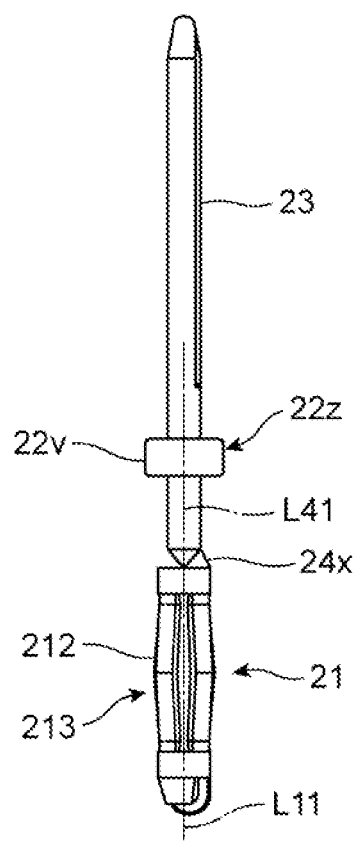
FIG. 39 is a right side view of the connector terminal illustrated in FIG. 37.

As illustrated in FIGS. 37 to 39, a connector terminal 20z in the fourth embodiment includes a shaft portion 22z situated between the press-fit terminal 21 and the pin portion 23. The shaft portion 22z is in the form of a circular cylinder.

Figure 40:
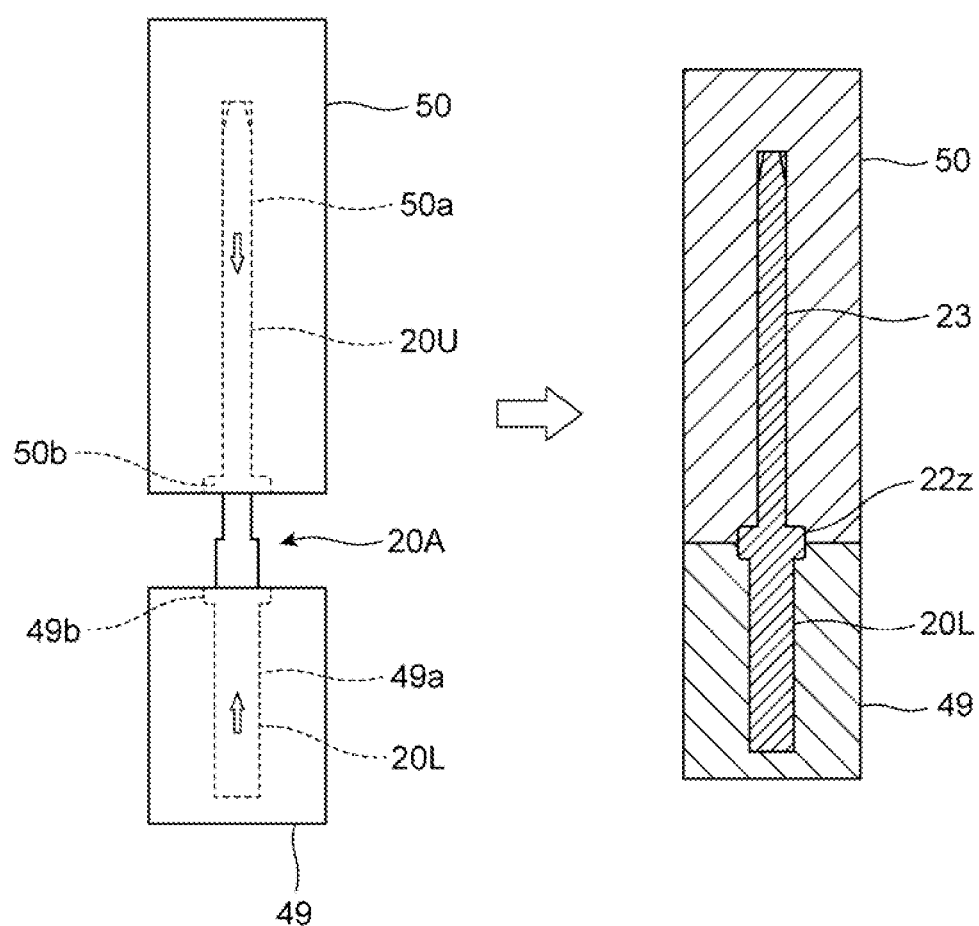
FIG. 40 illustrates a step of forming the shaft portion of the connector terminal illustrated in FIG. 37.
Figure 41:
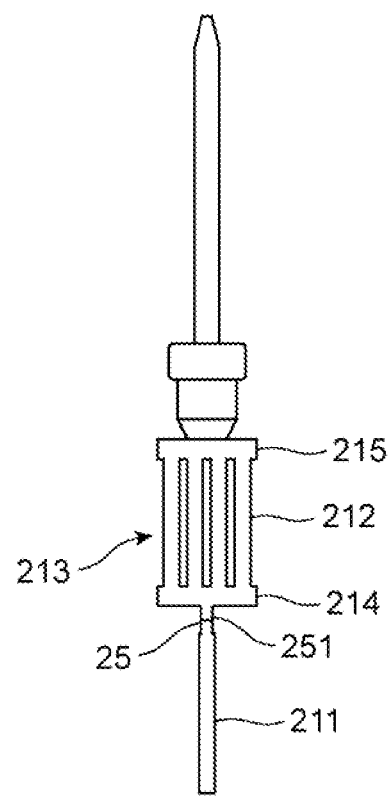
FIG. 41 is a plan view of the connector terminal illustrated in FIG. 37 with the shaft portion being already formed, but the press-fit terminal being not yet formed.

A method of fabricating the connector terminal 20z is explained hereinbelow with reference to FIGS. 40 and 41.

A lower portion 20L of a shaft 20A, of which the press-fit terminal 21 will be fabricated, is inserted into an inner space 49a formed in a first die 49, and an upper portion 20U of the shaft 20A, of which the pin portion 23 will be fabricated, is inserted into an inner space 50a of a second die 50. Then, the shaft 20A is axially compressed by pushing the second die 50 towards the first die 49.

The inner space 49a formed in the first die 49 is designed to have a lateral cross-section identical with a lateral cross-section of the lower portion 20L of the shaft 20A. The inner space 50a formed in the second die 50 is designed to have a lateral cross-section smaller than the same of the upper portion 20U. The inner spaces 49a and 50a are formed at opening edges thereof with circular recesses 49b and 50b, respectively. The circular recesses 49b and 50b define a cylindrical space identical in shape with the shaft portion 22z, when the first and second dies 49 and 50 are coupled with each other.

Thus, as a result that the shaft 20A is axially compressed by pushing the second die 50 towards the first die 49, a thickness of the upper portion 20U is shifted toward a center of the shaft 20A, and hence, the cylindrical shaft portion 22z is formed in the circular recesses 49b and 50b. The upper portion 20U is made thinner than its initial size to thereby define the pin portion 23.

Then, the lower portion 20L of the shaft 20A is rolled into a thin sheet. The resultant thin sheet is punched to thereby define the central shaft portion 211, the contact pieces 212, and the binders 214 and 215, as illustrated in FIG. 41.

Then, the central shaft portion 211 and the binders 214 and 215 are bent to thereby fabricate the press-fit terminal 21.

Then, as illustrated in FIG. 39, the positional relation between the press-fit terminal 21 and the shaft portion 22z is adjusted by deforming the adjustment portion 24 such that the imaginary center line L11 of the press-fit terminal 21 and an imaginary center line L41 of the shaft portion 22z are axial with each other.

The shaft portion 22z in the fourth embodiment is designed to be in the form of a circular cylinder having the imaginary center line L41 as a longitudinal center line. The binders 214 and 215 are bent into an arcuate form or a C-shape. Thus, the press-fit terminal 21 is shifted, by deforming the adjustment portion 24, into a direction opposite to a direction in which the binders 214 and 215 are bent, and further, perpendicular to the imaginary center line L11 of the press-fit terminal 21 to thereby cause the press-fit terminal 21 and the shaft portion 22z to be axial with each other.

By shifting the press-fit terminal 21 in a direction opposite to the direction in which the binders 214 and 215 are bent to thereby cause the press-fit terminal 21 and the shaft portion 22z to be axial with each other, the imaginary center line L11 of the press-fit terminal 21 and an imaginary center line (not illustrated) of the pin portion 23 can be axial with each other.

Thus, there is completed the connector terminal 20z illustrated in FIGS. 37 to 39.

Since the shaft portion 22z is in the form of a circular cylinder, the circumferential surfaces 22v of the shaft portion 22z are annular.

Figure 42:
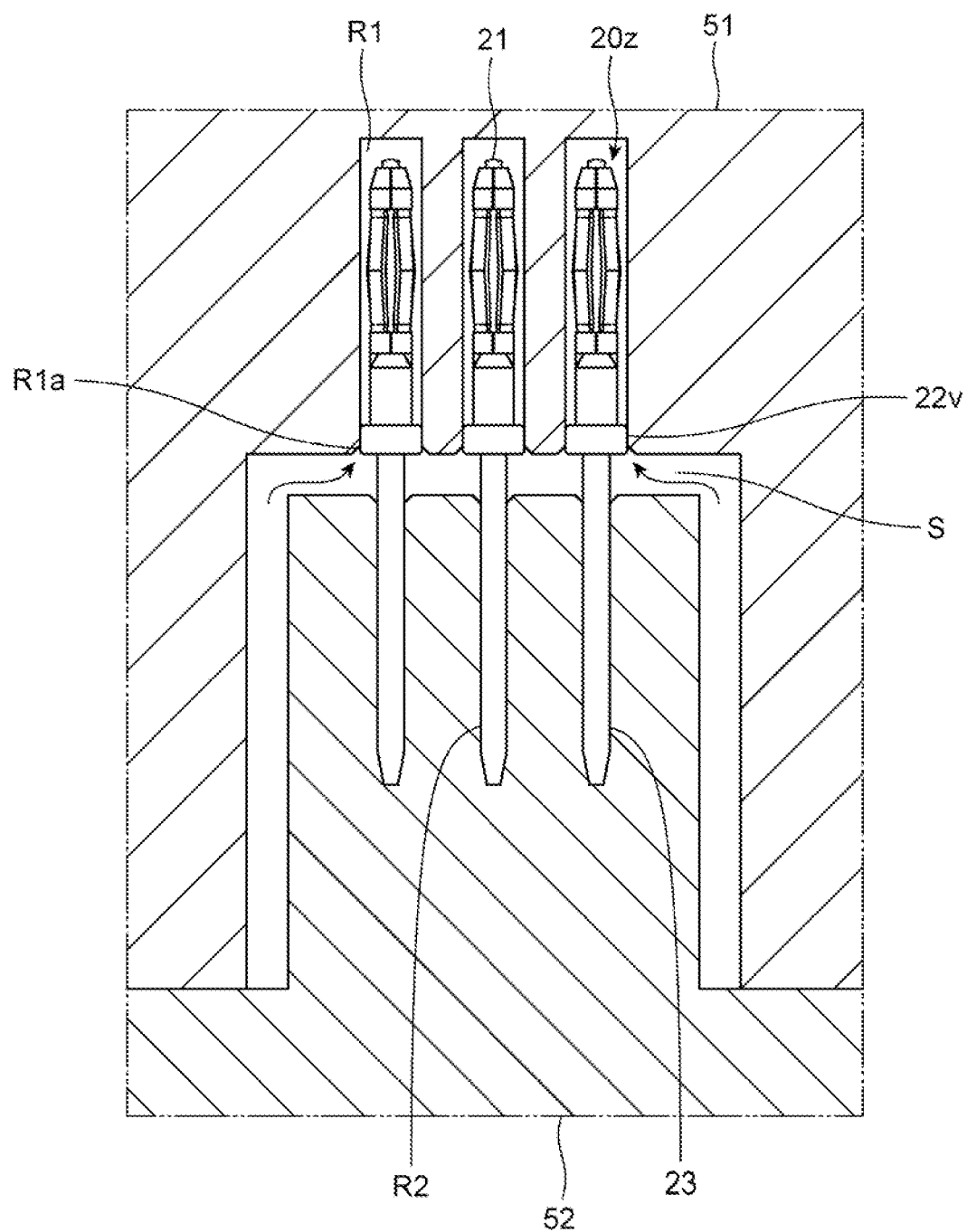
FIG. 42 is a cross-sectional view of the connector terminal and a die used for fabricating a housing of the electric connector in accordance with the fourth embodiment.
Figure 43:
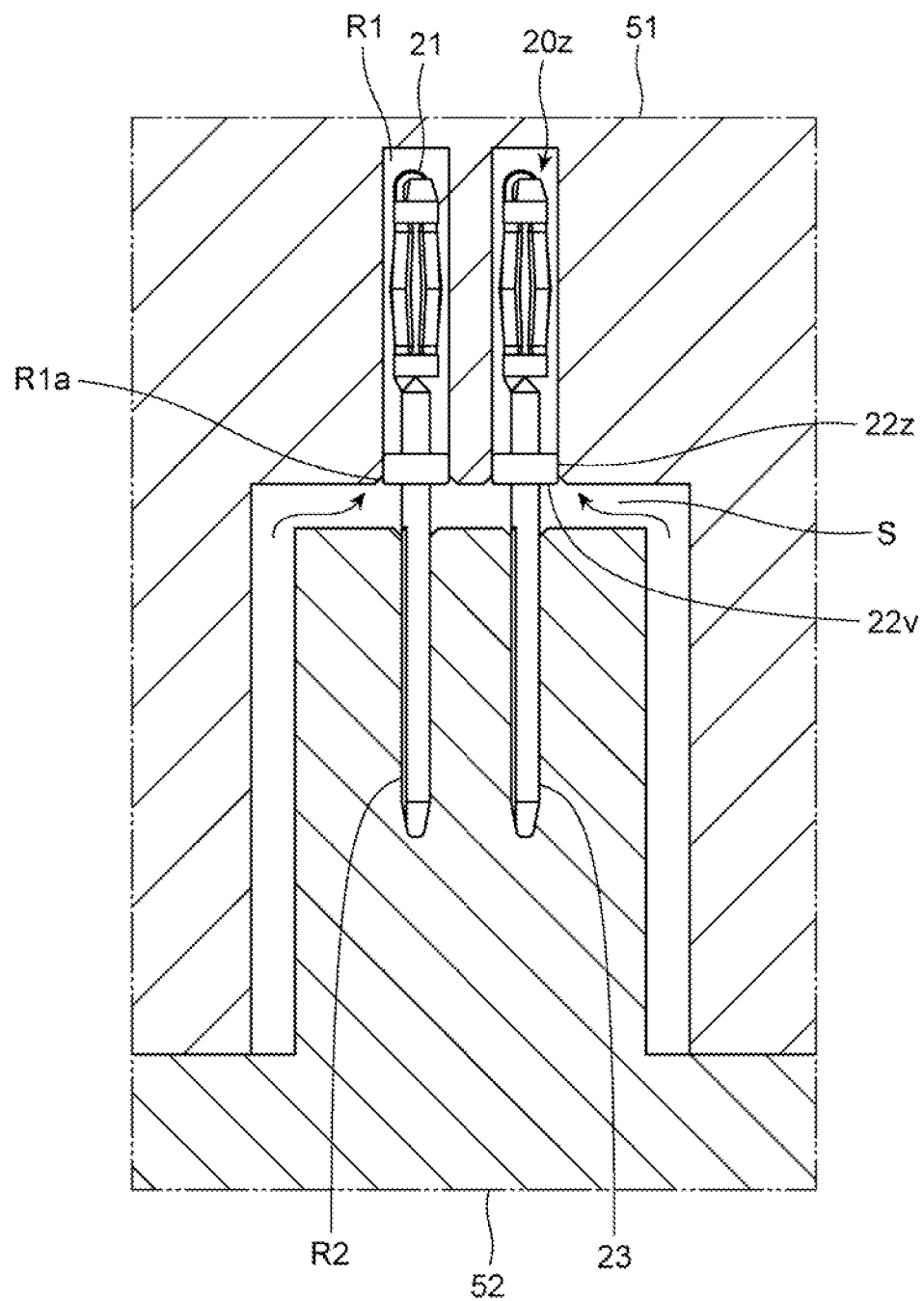
FIG. 43 is a cross-sectional view of the connector terminal and a die used for fabricating a housing of the electric connector in accordance with the fourth embodiment.
Figure 44:
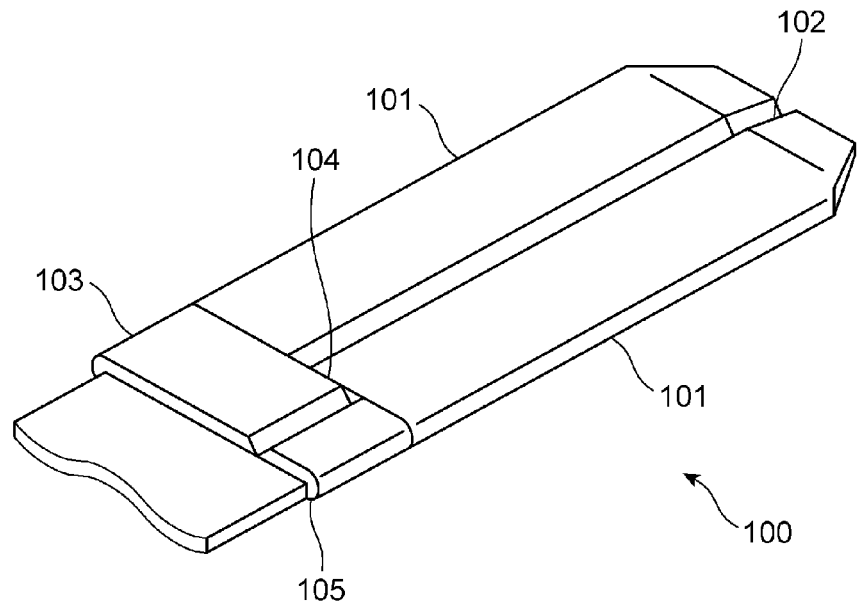
FIG. 44 is a perspective view of the conventional connector terminal.
Figure 45:
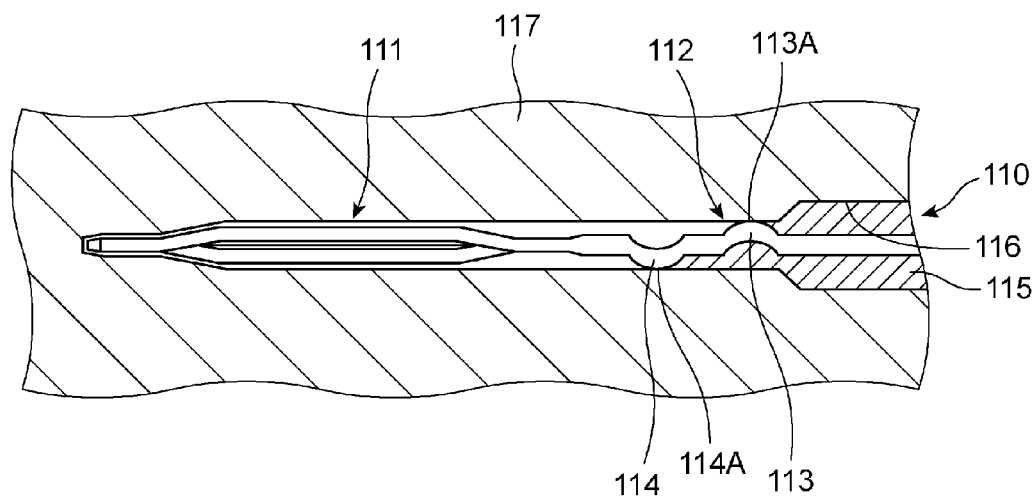
FIG. 45 is a cross-sectional view of another conventional connector terminal.

Then, as illustrated in FIGS. 42 and 43, the connector terminals 20z are sandwiched between a first die 51 and a second die 52, and then, compressed by them.

Inserting the press-fit terminals 21 of the connector terminals 20z into the first terminal spaces R1 of the first die 51, the circumferential surfaces 22v of the shaft portion 22y make close surface contact with inner surfaces of the first terminal spaces R1 to thereby prevent resin from penetrating the first terminal spaces R1 when the housing 30 is molded with resin.

Since the shaft portion 22z is designed to be in the form of a circular cylinder and the first terminal spaces R1 are designed to have a circular lateral cross-section identical with the lateral cross-section of the shaft portion 22z, the first space terminals R1 and the shaft portion 22z do not have a corner. This ensures that the circumferential surfaces 22v of the shaft portion 22z can make surface contact with the inner surfaces of the first terminal spaces R1 without any gap therebetween, and hence, sufficient impermeability can be accomplished between the first die 51 and the connector terminals 22z. Accordingly, it is possible to surely prevent resin filled in the space S from penetrating the first terminal spaces R1.

INDUSTRIAL APPLICABILITY

The electric connector in accordance with the present invention is broadly applicable as a device to be mounted on a printed circuit board, in various fields such as an electric/electronic device industry and an automobile industry.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A connector terminal including:
   a press-fit terminal; and
   a shaft portion formed at an end of said press-fit terminal, said shaft portion including:
   a first portion having a width greater than a width of said press-fit terminal, and being bent into an L-shape in a thickness-wise direction thereof; and
   an L-shaped second portion defining a crank together with said first portion,
   said shaft portion having a thickness greater than a thickness of said press-fit terminal.

2. The connector terminal as set forth in claim 1, further including an adjustment portion to allow an imaginary center line of said shaft portion and an imaginary center line of said press-fit terminal to align with each other.

3. An electric connector including:
   a connector terminal as set forth in claim 1; and
   a resin-molded housing holding said connector terminal such that said press-fit terminal of said connector terminal is exposed.

4. The connector terminal as set forth in claim 1, further including a pin portion having a needle-shaped top.

5. The connector terminal as set forth in claim 2, wherein said adjustment portion is deformable in a plane perpendicular to an axial direction of said connector terminal.

* * * * *